(12) United States Patent
Matoba et al.

(10) Patent No.: US 6,263,111 B1
(45) Date of Patent: Jul. 17, 2001

(54) IMAGE DATA COMPRESSION-EXPANSION CIRCUIT

(75) Inventors: Narihiro Matoba; Masaru Ohnishi, both of Kamakura; Masaaki Tanioka, Itami; Yukio Kodama, Itami; Yoshifumi Imanaka, Itami; Hiroaki Furuta, Itami; Eisaku Tomita, Itami, all of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/195,120

(22) Filed: Nov. 18, 1998

Related U.S. Application Data

(62) Division of application No. 08/667,965, filed on Jun. 19, 1996, now Pat. No. 5,912,742, which is a division of application No. 08/205,295, filed on Mar. 2, 1994, now Pat. No. 5,764,373.

(30) Foreign Application Priority Data

Oct. 14, 1992 (JP) .................................................... 4-275929
Mar. 16, 1993 (JP) .................................................... 5-55680
Apr. 6, 1993 (JP) .................................................... 5-79643

(51) Int. Cl.[7] ............................ H04N 1/41; H04N 1/415
(52) U.S. Cl. ........................ 382/232; 358/426; 358/433; 348/420
(58) Field of Search ................................. 358/426, 429, 358/432, 433, 443, 444, 448, 456; 382/232; 364/130, 133, 134; 348/384, 390, 420

(56) References Cited

U.S. PATENT DOCUMENTS

| | | |
|---|---|---|
| 4,788,598 | 11/1988 | Ochi et al. . |
| 4,912,771 | 3/1990 | Komine et al. . |
| 4,995,005 | 2/1991 | Lodhi . |
| 5,311,336 * | 5/1994 | Kurita et al. .......................... 358/453 |

FOREIGN PATENT DOCUMENTS

| | | |
|---|---|---|
| 0149451 | 7/1985 | (EP) . |
| 000310914 | 10/1991 | (JP) . |

OTHER PUBLICATIONS

Fawcett, Bradley K., "The Z8000 Microprocessor A Design Handbook", Prentice–Hall, Inc., 1982, pp. 36–41.

Kenichiro Oka & Masaru Onishi "Implementation of Image Compression For Printers" Consumer Products Laboratory, Mitsubishi Electric Corporation, Japan.

* cited by examiner

Primary Examiner—Thomas D. Lee

(57) ABSTRACT

A line buffer device temporarily stores a predetermined area of original image data which are divided into small blocks, each having a small area, so as to encode the image data for each block into data having a fixed length by a compression processor. The line buffer device is composed of a first-stage line buffer group and a second-stage line buffer group. The number of line buffers in the first-stage line buffer group is smaller by one than the number of lines constituting one block and the number of line buffers in the second-stage line buffer group is the same as the number of lines constituting one block. Encoding processing time is shortened and the circuit structure is simplified.

2 Claims, 25 Drawing Sheets

IMAGE DATA COMPRESSION-EXPANSION CIRCUIT

This application of application Ser. No. 08/667,965, filed Jun. 19, 1996, now U.S. Pat. No. 5,912,742 entitled IMAGE DATA COMPRESSION-EXPANSION CIRCUIT, which in turn is a division of U.S. Ser. No. 08/205,295 filed Mar. 2, 1994, now U.S. Pat. No. 5,764,373.

BACKGROUND OF THE INVENTION

1. Field of the Invention

The present invention relates to an image encoding and decoding apparatus for compressing and expanding image data and, more particularly, to an image data compression and expansion circuit for compressing and expanding encoded image data having a fixed data length.

The present invention also relates to an image encoding apparatus for compressing or expanding image data and, more particularly, to an image data compressing and expanding circuit for compressing and expanding encoded image data having a fixed data length.

The present invention further relates to an encoding method for compressing and expanding the data on a half tone image which is divided into blocks each having a small area.

2. Description of the Related Art

Methods of using input and output line buffers as a toggle have conventionally been proposed in order to increase the processing speed of the input and the output of image data. One such method is disclosed in Japanese Patent Laid-Open No. Sho 63-84270. The method disclosed in Japanese Patent Laid-Open No. Sho 63-84270 requires two line buffers 12, 13 of the same size, as shown in FIG. 20, in order to realize a toggle line buffer. This method is advantageous in that it is possible to process image data consecutively by reading image data from one line buffer 12 while writing image data into the other line buffer 13.

When image data is input or output from the line buffer 12 or 13, it is necessary to switch the line buffers 12 and 13 from one to the other by a data selector 16 every time the data for one line is input or output.

In order to apply the system of the conventional image processing apparatus having the above-described structure to a block encoding system, it is necessary to process the data for one line in a block as a unit. It is therefore necessary to provide the same number of input and output line buffers as the number of lines constituting one block. That is, twice as many line buffers as the lines constituting one block are required, and the increase in the number of line buffers unfavorably raises the cost of the image processing apparatus.

In addition, when the image data are read out of the line buffer, it is necessary not only to switch the line buffers for data in different blocks but for data for different lines within one block. The time assigned to the switching of the line buffers for data for different lines within one block is, under the severest condition, not longer than the time for which the image data for one pixel is transferred.

Furthermore, according to this method, if the image data transferring speed is higher than the response speed (reading speed of the FIFO) of the selector of the line buffer, the switching operation between the line buffers cannot overtake the data transferring operation. As a result, the output data of the adjacent line buffers collide with each other, so that high-speed image data compression-expansion is impossible.

Methods of editing encoded image data have conventionally been proposed. One such method is disclosed in Japanese Patent Laid-Open No. Hei 3-110914. FIG. 21 is a functional block diagram of the method disclosed in Japanese Patent Laid-Open No. Hei 3-110914. An image memory compresses the image data for one screen by a fixed length for each block, and the compressed image data are stored in the image memory consisting of one memory bank which is controlled by a one-system control signal. If the encoded data for one block is read and decoded as a unit, it is possible to edit the image data at the time of decoding.

In the conventional image data compressing method having the above-described structure, when the original image data are simultaneously encoded and decoded, access control is necessary for the operation of storing the encoded image data into the image memory and the operation of reading the encoded data from the image memory. It is therefore difficult to process the image data consecutively at a high speed, and the control method is complicated.

Methods of encoding image data which is divided into blocks each having a small area have conventionally been proposed. One such method is described in "Image Data Compressing Circuit for Hard Copy Apparatus", D-254 in the proceedings of the autumn meeting of the Institute of Electronics, Information and Communication Engineers, 1990. FIG. 22 shows the structure of the encoding circuit described in this literature. In FIG. 22, the reference numeral 101 represents an image buffer memory for converting the image data which are input with the data for one line as a unit into blocks of data (X11 to X44), each block having 4×4 pixels, 102 a maximum and minimum representative tone level threshold value computing means for extracting the maximum tone level ($L_{max}$) and the minimum tone level ($L_{min}$) in the block and computing the threshold values (P2, P1) for obtaining the maximum•minimum representative tone levels, 103 a reference level•difference computing means for obtaining the maximum and minimum representative tone levels (Q4, Q1) on the basis of the image data of the block (X11 to X44) and the threshold values (P2, P1) and further obtaining the reference level (LA) and the difference (LD), 104 a quantized threshold value computing means for computing the quantized threshold values (L2, L1) from the reference level (LA) and the difference (LD), 105 a resolution information computing means for quantizing the image data (X11 to X44) on the basis of the quantized threshold values (L2, L1) and the reference level (LA) and obtaining resolution information ($\phi11$ to $\phi44$), and 106 an encoded data buffer for storing the reference level (LA), the difference (LD) and the resolution information ($\phi11$ to $\phi44$) and serially outputting them as encoded data.

The following formulas (1) to (9) show the encoding algorithm in the encoding circuit. The encoding method will now be explained with reference to these formulas and FIG. 22.

Encoding algorithm:

$$P1 = (L_{max} + 3L_{min})/4 \quad (1)$$

$$P2 = (3L_{max} + L_{min})/4 \quad (2)$$

$$Q1 = \text{Average value of } (Xij \leq P1) \quad (3)$$

$$Q4 = \text{Average value of } (Xij > P2) \quad (4)$$

$$LA = (Q1 + Q4)/2 \quad (5)$$

$$LD = (Q4 - Q1) \quad (6)$$

$$L1 = LA - LD/4 \quad (7)$$

$$L2 = LA + LD/4 \quad (8)$$

$$\begin{aligned}
&\text{for } (i = 1 \text{ to } 4) \\
&\quad \text{for } (j = 1 \text{ to } 4) \\
&\quad\quad \text{if } Xij \le L1 \\
&\quad\quad\quad \phi ij = 01 \text{ (binary)} \\
&\quad\quad \text{else if } Xij \le LA \\
&\quad\quad\quad \phi ij = 00 \text{ (binary)} \\
&\quad\quad \text{else if } Xij \le L2 \\
&\quad\quad\quad \phi ij = 10 \text{ (binary)} \\
&\quad\quad \text{else} \\
&\quad\quad\quad \phi ij = 11 \text{ (binary)} \\
&\quad \text{end\_for} \\
&\text{end\_for}
\end{aligned} \quad (9)$$

The maximum and minimum representative tone level threshold value computing means 102 first extracts the maximum tone level ($L_{max}$) and the minimum tone level ($L_{min}$) of the pixels Xij (i, j=1 to 4) in the block output from the image buffer memory 1 and computes the threshold values (P2, P1) in accordance with the formulas (1) and (2). Then the reference level•difference computing means 103 obtains the maximum and minimum representative tone levels (Q4, Q1) in accordance with the formulas (3) and (4), and computes the reference level (LA) and the difference (LD) in accordance with the formulas (5) and (6). The quantized threshold value computing means 104 computes the quantized threshold values (L2, L1) in accordance with the formulas (7) and (8). The resolution information computing means 105 then quantizes the image data (X11 to X44) on the basis of the quantized threshold values (L2, L1) in accordance with the formula (9) and computes the resolution information ($\phi$11 to $\phi$44). Finally, the reference level (LA), the difference (LD) and the resolution information ($\phi$11 to $\phi$44) stored in the encoded data buffer 106 are serially output as the encoded data.

If it is assumed that the tone level of an image is represented by 8 bits (0 to 255), according to this encoding method, the encoded data in each block is composed of the reference level LA of 8 bits, the difference LD of 8 bits and the resolution information ($\phi$11 to $\phi$44) of 32 bits, making 48 bits in total, as shown in FIG. 25. Since one block has 8 bits×4×4, the compression ratio is 128/48=8/3.

The decoding method in the literature will now be explained. FIG. 23 shows the structure of the decoding circuit described in this literature. In FIG. 23, the reference numeral 111 represents an encoded data buffer for storing the encoded data and outputting them in the form of the reference level (LA), the difference (LD) and the resolution information ($\phi$11 to $\phi$44), 112 a representative tone level computing means for obtaining the representative tone levels (Q1 to Q4) from the reference level (LA) and the difference (LD), 113 a representative tone level allotting means for reproducing the block image data (Y11 to Y44) on the basis of the representative tone levels (Q1 to Q4) and the resolution information ($\phi$11 to $\phi$44), and 114 an image buffer memory for storing the reproduced block data and outputting the image data for each line.

The following formulas (10) to (14) show the decoding algorithm in this decoding circuit. The decoding method will now be explained with reference to these formulas and FIG. 23.

Decoding algorithm:

$$Q1 = LA - LD/2 \quad (10)$$

$$Q2 = LA - LD/6 \quad (11)$$

$$Q3 = LA + LD/6 \quad (12)$$

$$Q4 = LA + LD/2 \quad (13)$$

$$\begin{aligned}
&\text{for } (i = 1 \text{ to } 4) \\
&\quad \text{for } (j = 1 \text{ to } 4) \\
&\quad\quad \text{if } \phi ij = 01 \\
&\quad\quad\quad Yij = Q1 \\
&\quad\quad \text{else if } \phi ij = 00 \\
&\quad\quad\quad Yij = Q2 \\
&\quad\quad \text{else if } \phi ij = 10 \\
&\quad\quad\quad Yij = Q3 \\
&\quad\quad \text{else} \\
&\quad\quad\quad Yij = Q4 \\
&\quad \text{end\_for} \\
&\text{end\_for}
\end{aligned} \quad (14)$$

The representative tone level computing means 112 first computes the representative tone levels (Q1 to Q4) from the reference level (LA) and the difference (LD) output from the encoded data buffer 111 in accordance with the formulas (10) to (13). The representative tone level allotting means 113 then reproduces the block image data (Y11 to Y44) from the resolution information ($\phi$11 to $\phi$44) in accordance with the formula (14) and writes the reproduced data into the image buffer memory 114. The image buffer memory 114 finally outputs the reproduced block data for each line. Each pixel of the thus-reproduced data has one of the representative tone levels (Q1 to Q4) which are arranged at regular intervals as shown in FIG. 24.

According to the decoding method having the above-described structure, since the image data are reproduced so as to have the representative tone levels constantly arranged at regular intervals without the distributed state of the tone levels of the image taken into any consideration, the picture quality is sometimes deteriorated. In addition, since it is presupposed that the representative tone levels are arranged at regular intervals, the division processings such as the formulas (11) and (12) are necessary, which leads to the problems such as a low processing speed and a large circuit scale.

Furthermore, since the threshold values for obtaining the maximum representative tone level and the minimum representative tone level are set by internally dividing the interval between the maximum tone level and the minimum tone level of the pixels in the block by a fixed ratio, as represented by the formulas (1) and (2), without the distributed state of the tone levels of the image being taken into consideration at all, when the difference between the maximum tone level and the minimum tone level of the pixels in the block is large, if the distribution width of the tone levels in the image data in the range represented by the maximum or minimum representative tone level is large, the deterioration of the picture quality is considerable.

SUMMARY OF THE INVENTION

Accordingly, it is an object of the present invention to eliminate the above-described problems in the related art and to provide an inexpensive image data compression circuit by reducing the number of line buffers for temporarily storing a predetermined area of original image data.

It is another object of the present invention to provide an image data compression circuit which enables high-speed image data compression.

It is still another object of the present invention to provide an inexpensive image data expansion circuit by reducing the number of line buffers for temporarily storing encoded image data.

To achieve these ends, in an image data compression circuit provided in a first aspect of the present invention, a line buffer device for temporarily storing a predetermined area of original image data which are divided into small blocks each having a small area so as to encode the image data for each block into data having a fixed length is composed of a first-stage line buffer group and a second-stage line buffer group. The number of line buffers in the first-stage line buffer group is smaller by one than the number of lines constituting one block and the number of line buffers in the second-stage line buffer group is the same as the number of lines constituting one block. A control circuit for producing a control signal for controlling the writing and reading operation into and from each line buffer is provided in the image data compression circuit.

In an image data compression circuit provided in a second aspect of the present invention, a storing means for temporarily storing a predetermined area of original image data which is to be compressed by the compression processing portion is composed of at least a pair of line buffers in the second-stage line buffer group, and the data line through which the data are read by the compression processing portion connects a plurality of line buffers which are not adjacent to each other in the second-stage line buffer group.

In an image data expansion circuit provided in a third aspect of the present invention, a line buffer device for temporarily storing a predetermined area of decoded image data is composed of a first-stage line buffer group and a second-stage line buffer group. The number of line buffers in the first-stage line buffer group is the same as the number of lines constituting one block and the number of line buffers in the second-stage line buffer group is smaller by one than the number of lines constituting one block. A control circuit for producing a control signal for controlling the reading and writing operation from and into each line buffer is provided in the image data expansion circuit.

Since the original image data output from any adjacent line buffers are read by the compression processing portion through different data lines, even if the transfer speed is higher than the response speed of a selector, the output data of adjacent line buffers are read without colliding with each other.

The line buffer device composed of the first-stage line buffer group and the second-stage line buffer group temporarily stores a predetermined area of decoded image data, and the operation of reading and writing the decoded image data from and into each line buffer is controlled in accordance with a control signal output from the control circuit.

It is a further object of the present invention to provide a compressed image controlling apparatus which enables the image data for a plurality of screens to be consecutively encoded and decoded without the need for the control of the access to the image memory.

It is a still further object of the present invention to provide a compressed image controlling apparatus which enables image data to be stored and read into and from an image memory at a high speed.

To achieve these ends, an image memory in the present invention stores encoded image data having a fixed length. The image memory for storing the data for one color or one screen is composed of a plurality of memory banks. An image data storage controller and an image data readout controller can freely select one or more memory banks, and when a plurality of memory banks are simultaneously selected, the selected memory banks can be processed as a continuous memory bank.

When a plurality of memory banks are simultaneously selected, the width of the data lines becomes plural times as large as the width of one data line. The width of the data line in this case is not larger than the data width of the encoded data.

According to this structure, since it is possible to control the image memory portion which can efficiently store the encoded data of the original image having a fixed length and the image memory portion which can efficiently read the encoded data having a fixed length as the independent memory banks, encoding and decoding can be simultaneously executed in different memory banks, thereby realizing high-speed processing.

In addition, it is possible to store and read the encoded data into and from the image memory at a high speed.

It is a further object of the present invention to provide an encoding apparatus which can improve the picture quality of a reproduced image and which can increase the processing speed and reduce the circuit scale.

To achieve this aim, in a fourth aspect of the present invention, there is provided an encoding apparatus comprising: a means for setting the representative tone levels except the maximum representative tone level and the minimum representative tone level to the values obtained by internally dividing the interval between the maximum representative tone level and the minimum representative tone level by a ratio (hereinunder referred to as "internal division ratio for internal representative tone levels") which is variably designated by an external equipment; a means for selecting the internal division ratio for internal representative tone levels for each block; and an encoding means which utilizes the selected internal division ratio for internal representative tone levels as additional information.

The encoding apparatus further comprises:. a means for setting the threshold values for obtaining the maximum representative tone level and the minimum representative tone level to the values obtained by internally dividing the interval between the maximum tone level and the minimum tone level of the pixels in a block by a ratio (hereinunder referred to as "internal division ratio for maximum•minimum representative tone levels") which is variably designated by an external equipment at the time of setting the maximum or minimum representative tone level; and a means for selecting the internal division ratio for maximum•minimum representative tone levels for each block in accordance with the distribution of the tone levels in the image data.

According to the encoding apparatus of the present invention, the representative tone levels except the maximum representative tone level and the minimum representative tone level are set to values obtained by internally dividing the interval between the maximum representative tone level and the minimum representative tone level by the internal division ratio for internal representative tone levels which is variably designated by an external equipment, and the internal division ratio for internal representative tone levels is selected for each block. It is therefore possible to select appropriate representative tone levels with the distributed state of the tone levels of the image taken into consideration. In addition, by selecting the internal division ratio for internal representative tone levels which obviates division processing, it is possible to increase the processing speed and reduce the circuit scale.

In addition, the threshold values for obtaining the maximum representative tone level and the minimum representative tone level are set to the values obtained by internally dividing the interval between the maximum tone level and the minimum tone level of the pixels in a block by the internal division ratio for maximum•minimum representative tone levels which is variably designated by an external equipment; and the internal division ratio for maximum•minimum representative tone levels is selected for each block in accordance with the distribution of the tone levels in the image data. It is therefore possible to select appropriate maximum or minimum representative tone level with the distributed state of the tone levels of the image taken into consideration.

The above and other objects, features and advantages of the present invention will become clear from the following description of the preferred embodiments thereof, taken in conjunction with the accompanying drawings.

DESCRIPTION OF THE PREFERRED EMBODIMENTS

Embodiment 1-1

Figure 1:
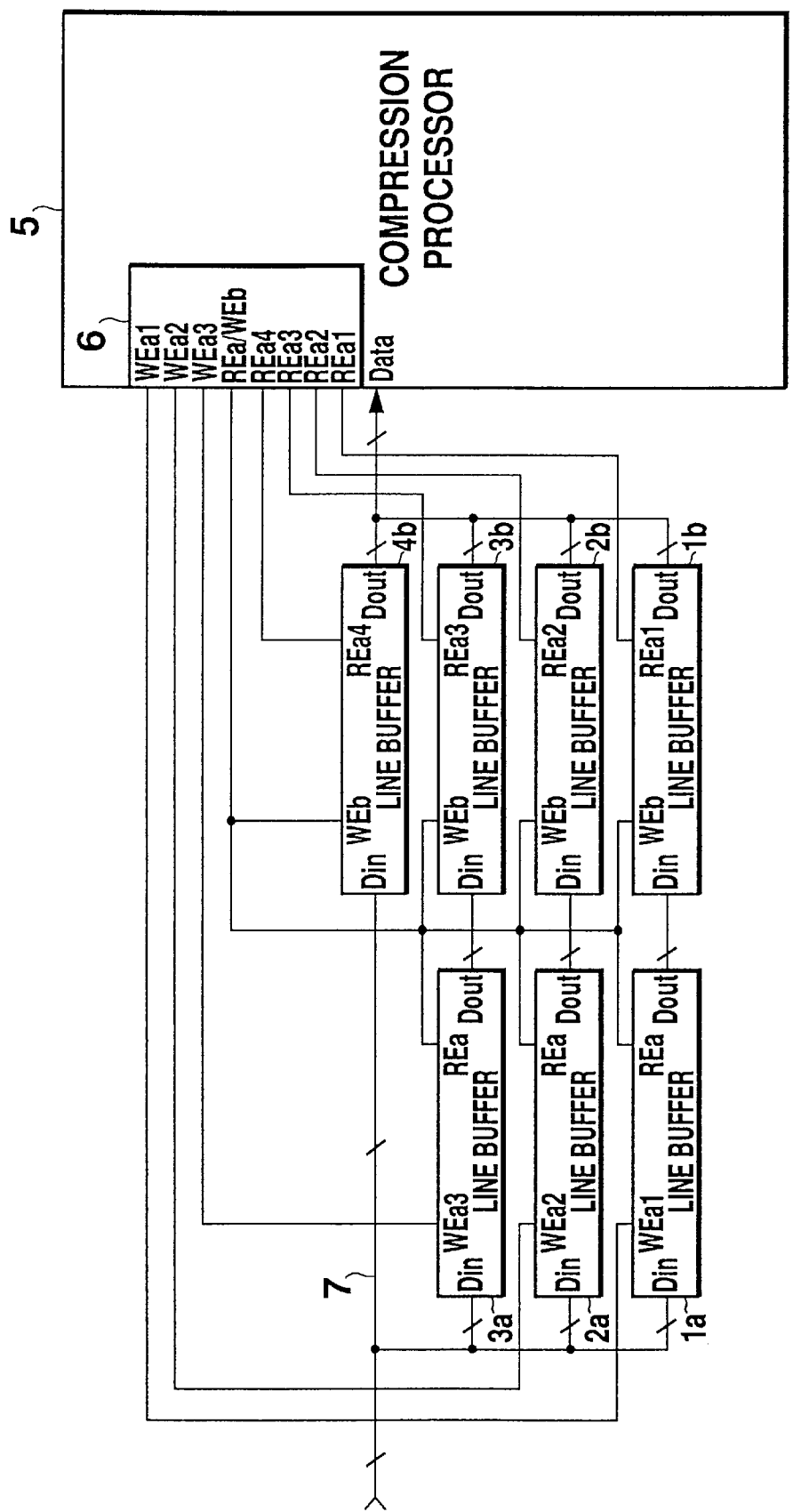
FIG. 1 is a block diagram of an embodiment of an image data compression circuit according to the present invention.

FIG. 1 is a block diagram of an embodiment of an image data compression circuit according to the present invention. In FIG. 1, line buffers 1a, 2a and 3a provided at a first stage are composed of FIFOs connected in parallel. Line buffers 1b, 2b, 3b and 4b provided at a second stage are also composed of FIFOs. The line buffers 1b to 3b at the second stage are connected to the line buffers 1a to 3a at the first stage, respectively. A compression processor 5 reads and encodes the original image data which are divided into blocks each having a small area. The compression processor 5 is provided with a controller 6 for producing a control signal for controlling the operation of writing and reading the data into and from each line buffer. The reference numeral 7 denotes an input line through which the original image data is input. In this embodiment, the block size is 4×4, so that the three line buffers are provided at the first stage and the four line buffers are provided at the second stage.

The operation of this embodiment will now be explained. Since the block size is 4×4, the image data for 4 lines (hereinunder referred to as "block line") is processed as a unit. The image data for the first line which is input from the input line 7 is first written into the FIFO 1a in accordance with a signal WEa1. The image data for the second line and the image data for the third line are consecutively written into the FIFOs 2a and 3a in accordance with signals WEa2 and WEa3, respectively. When the image data for the fourth line is written into the FIFO 4b in accordance with a signal WEb, the image data is simultaneously read from the FIFO 1a and written into the FIFO 1b in accordance with a signal REa. Similarly, in accordance with the signal REa, the image data are simultaneously transferred from the FIFO 2a to the FIFO 2b and from the FIFO 3a to the FIFO 3b when the image data for the fourth line is written into the FIFO 4b in accordance with the signal WEb. In this way, the image data for the first to fourth lines in the first block line are stored in the FIFOs 1b to 4b.

Subsequently, when the image data for the first line in a second block line is written into the FIFO 1a, the image data for the first pixel of the first line in the first block line which is stored in the FIFO 1b is simultaneously read and input to the compression processor 5 in accordance with a signal REa1. The image data for the first pixel of the second line in the first block line which is stored in the FIFO 2b is then read and input to the compression processor 5 in accordance with a signal REa2. The image data for the first pixel of the third line in the first block line is then read and input to the compression processor 5 in accordance with a signal REa3. The image data for the first pixel of the fourth line in the first block line is next read and input to the compression processor 5 in accordance with a signal REa4. This operation is continued and when the writing operation of the image data for the first line in the second block line into the FIFO 1a is finished in the process of this operation, the image data for the second line is written into the FIFO 2a, and then the image data for the third line are written into the FIFO 3a. In this way, the image data for each line is written into the FIFO 1a to FIFO 3a at the first stage, but when the image data are read from the FIFOs 1b to 4b at the second stage, the line buffers are switched from one to another every time the data for one pixel is output.

While the image data for each pixel is read out of the FIFOs 1b to 4b and input to the compression processor 5, the image data for the first line to the third line in the second block line are written into the FIFOs 1a to 3a. Further, the block data for the fourth line in the second block line is written into the FIFO 4b and the data for the first to third lines in the second block line are simultaneously read out of the FIFOs 1a to 3a and written into the FIFOs 1b to 3b. When the writing operation is finished, the image data are read from the FIFOs 1b to 4b while switching the line buffers from one to another for the data for each pixel. The data are input into the compression processor 5, which compress the data. These operations are continued until the final line of the original image data so as to read and compress the image data.

Embodiment 1-2

Figure 2:
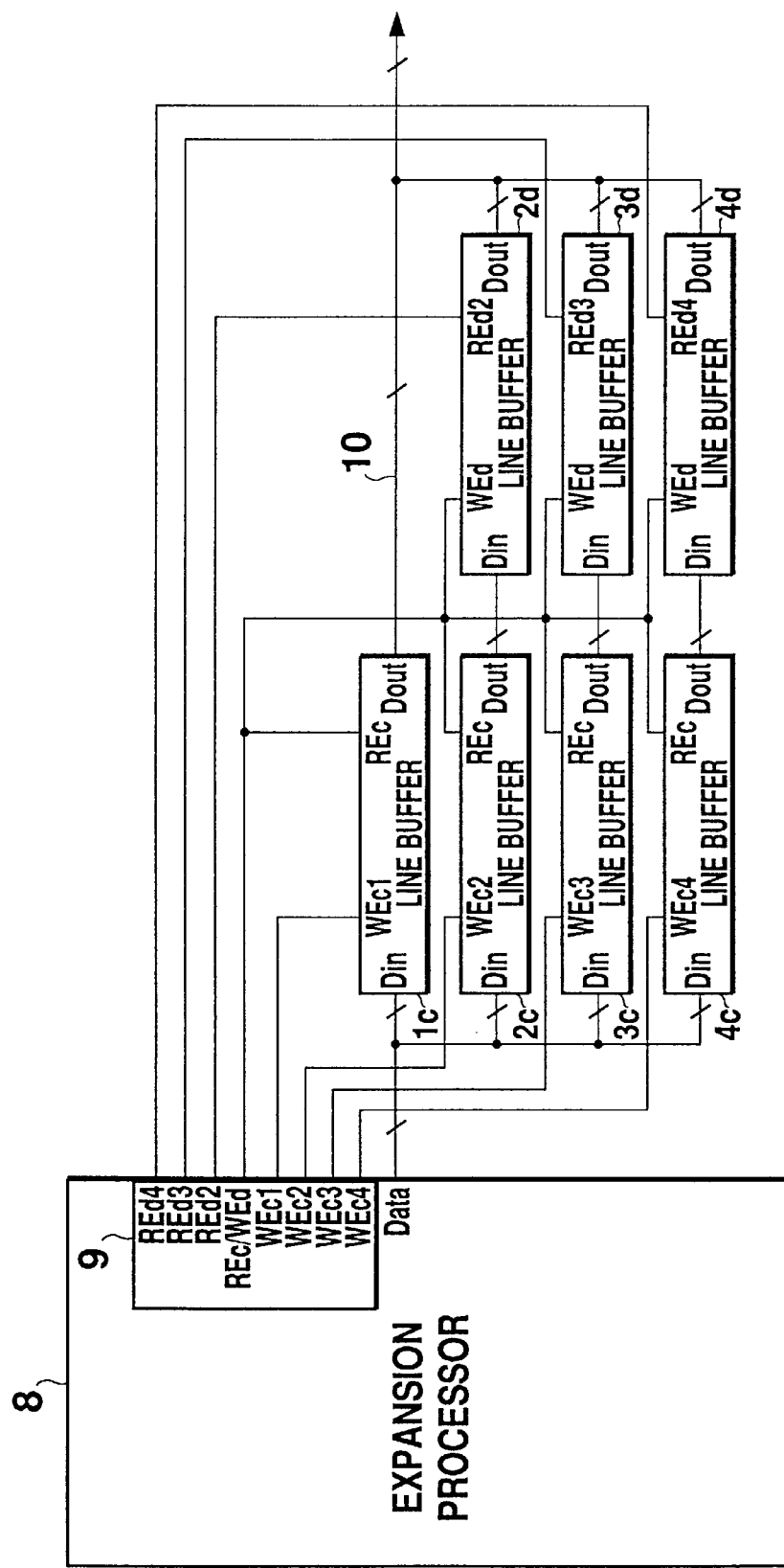
FIG. 2 is a block diagram of an embodiment of an image data expansion circuit according to the present invention.

FIG. 2 is a block diagram of an embodiment of an image data expansion circuit according to the present invention. In FIG. 2, line buffers 1c, 2c, 3c and 4c provided at a first stage are composed of FIFOs connected in parallel. Line buffers 2d, 3d and 4d provided at a second stage are also composed of FIFOs. The line buffers 2d to 4d at the second stage are connected to the line buffers 2c to 4c at the first stage, respectively. An expansion processor 8 decodes the encoded data which are divided into blocks each having a small area and which have a fixed length in each block. The expansion processor 8 is provided with a controller 9 for producing a control signal for controlling the operation of writing and reading the data into and from each of the line buffers 1c to 4c and 2d to 4d. The reference numeral 10 denotes a readout line through which the original image data is read out. In this embodiment, the block size is 4×4, so that the four line buffers are provided at the first stage and the three line buffers are provided at the second stage.

The operation of this embodiment in which the block size is 4×4 and FIFOs are used for the line buffers will now be explained. The image data for one block line is processed as a unit. The decoded data for the first pixel of the first line which is output from the expansion processor 8 is first written into the FIFO 1c in accordance with a signal WEc1. The decoded data for the first pixel of the second line, the decoded data for the first pixel of the third line and the decoded data for the first pixel of the fourth line are consecutively written into the FIFOs 2c, 3c and 4c in accordance with signals WEc2, WEc3 and WEc4, respectively. In this way, the decoded data for the four lines in the first block line are written into the FIFOs 1c to 4c while switching the line buffers from one to another every time the decoded data for one pixel is input.

Thereafter, the decoded data for the first line in the first block line which is stored in the FIFO 1c is serially read and output and, simultaneously, the decoded data for the second to fourth lines are read from the FIFO 2c and written into the FIFO 2d, from the FIFO 3c into the FIFO 3d and from the FIFO 4c into the FIFO 4d, respectively. In this way, while the decoded data for the first line in the first block line is output, the decoded data for the second to fourth lines in the first block line are stored in the FIFOs 2d to 4d.

When the reading operation of the decoded data for the first line is finished, the decoded data for the second line stored in the FIFO 2d, the decoded data for the third line stored in the FIFO 3d and the decoded data for the fourth line stored in the FIFO 4d are read out. In synchronism with the reading operation, the writing operation of the decoded data for the second block line into the FIFOs 1c to 4c are executed while switching the line buffers from one to another every time the decoded data for one pixel is input. These operations are continued until the final line of the image data so as to read out the decoded data.

Embodiment 1-3

Figure 3:
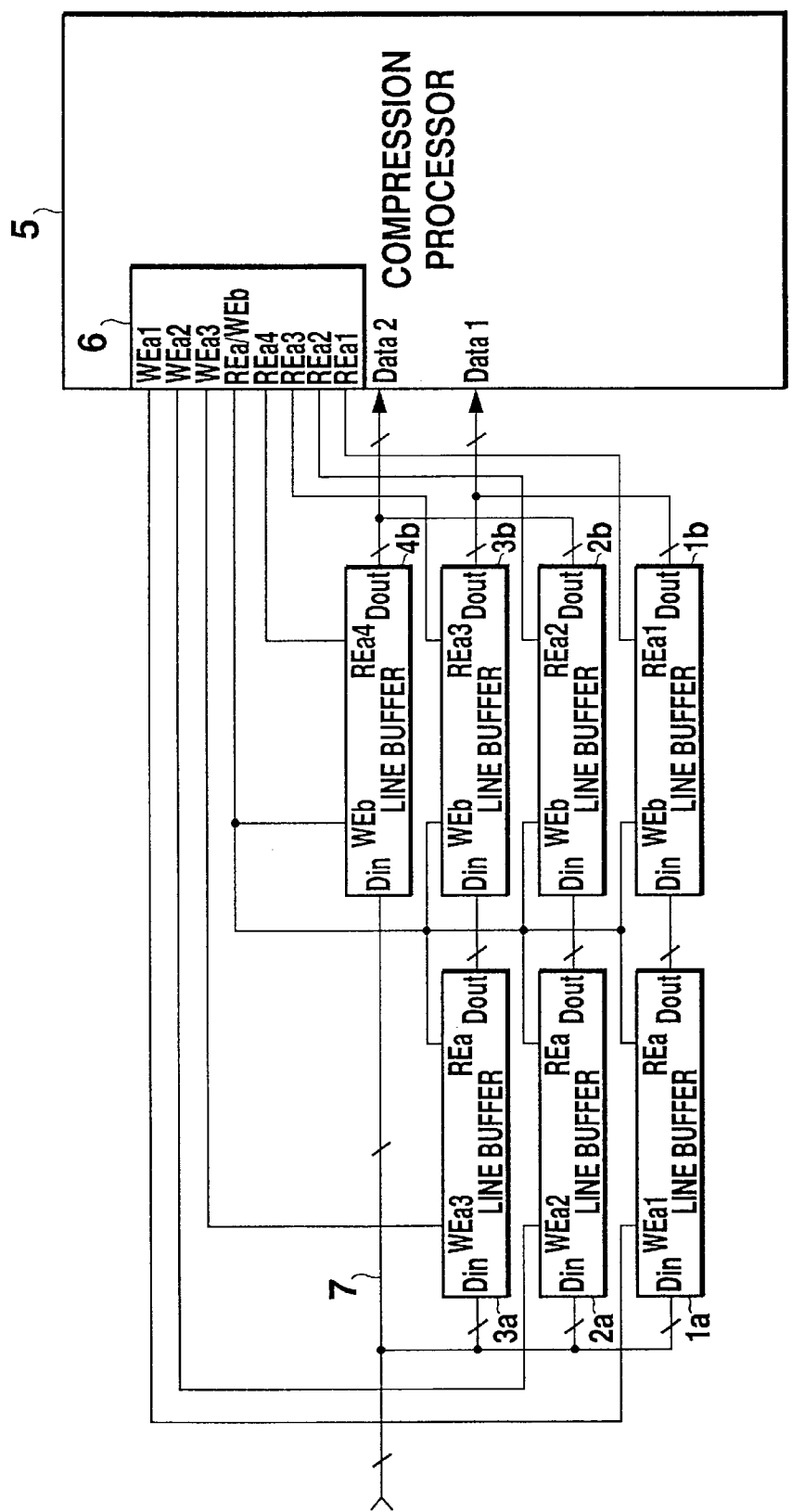
FIG. 3 is a block diagram of another embodiment of an image data compression circuit according to the present invention.

FIG. 3 is a block diagram of another embodiment of an image data compression circuit according to the present invention. The operation of this embodiment in which the block size is 4×4 and FIFOs are used for the line buffers will be explained. The image data for one block line is processed as a unit. The same operation is executed as in the Embodiment 1-1 until the image data are stored in the FIFOs 1b to 4b at the second stage. When the image data for the block line stored in the FIFO 1b, FIFO 2b, FIFO 3b and FIFO 4b are read out in accordance with the signals REa1, REa2, REa3 and REa4, respectively, the line buffers are switched from one to another every time the data for one pixel is output. At this time, in this embodiment, the image data for the first and third lines are read and output to the compression processor 5 through a signal line Data 1, and the image data for the second and fourth lines through a signal line Data 2.

According to this structure, since the line buffers from which the data are read are not adjacent, even if the transfer speed is higher than the response speed of a selector (semiconductor element), the output data of adjacent line buffers are read without colliding with each other, thereby enabling high-speed processing.

Embodiment 1-4

This is still another embodiment of an image data compression circuit according to the present invention. The image data are read out of the FIFOs 1b to 4b while switching the line buffers from one to another every time the data for one pixel is output in Embodiment 1-1. In contrast, in this embodiment, after the data for all the pixels of each line in the block line are consecutively read, the line buffers are switched.

Embodiment 1-5

This is another embodiment of an image data expansion circuit according to the present invention. In Embodiment 1-2, the decoded data are written into the FIFOs 1c to 4c while switching the line buffers from one to another every time the data for one pixel is input. In this embodiment, after the data for all the pixels of each line in the block line are consecutively written, the line buffers are switched.

Embodiment 1-6

This is a further embodiment of an image data compression circuit according to the present invention. This embodiment has a similar structure to Embodiment 1-3. Although the signal lines Data 1 and Data 2 are alternately used for the purpose of reading the image data from the FIFO 1*b*, FIFO 2*b*, FIFO 3*b* and FIFO 4*b* in Embodiment 1-3, the reading operation and the writing operation are simultaneously executed in this embodiment and the reading speed is reduced.

As explained above in Embodiments 1-1 to 1-6, although a toggle line buffer is used in order to increase the processing speed, it is possible to reduce the number of line buffers even if the block data encoding system is adopted. It is therefore possible to provide an inexpensive image data compression-expansion circuit.

In addition, even if the image data transfer speed is higher than the response speed of a selector, since the line buffers from which the data are read are not adjacent, the output data of adjacent line buffers are read without colliding with each other, thereby enabling high-speed processing.

Embodiment 2-1

Figure 4:
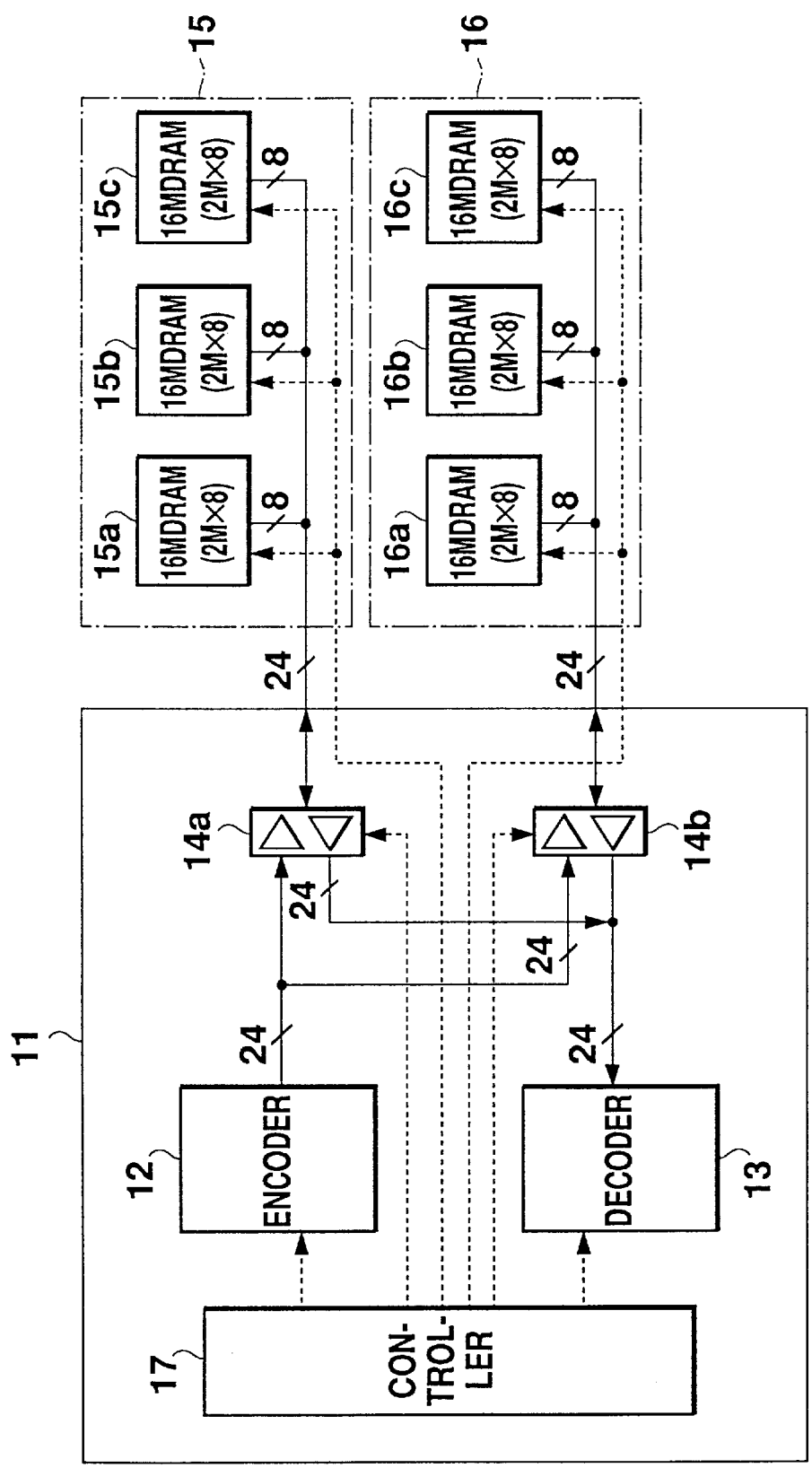
FIG. 4 is a block diagram of an embodiment of a compressed image memory control circuit according to the present invention.

FIG. 4 is a block diagram of an embodiment of a compressed image memory control circuit according to the present invention. In FIG. 4, the reference numeral 11 represents an image data control block, 12 an encoder for encoding original image data, 13 a decoder for decoding encoded data, 14*a* and 14*b* selectors for selecting whether the encoded data output from the encoder 12 is to be stored in the memory or the encoded data output from the memory is to be supplied to the decoder 13, 15 a first memory bank for storing encoded data which is composed of three DRAMs 15*a* to 15*c* of 16 M (2 M×8), 16 a second memory bank for storing encoded data which is composed of three DRAMs 16*a* to 16*c* of 16 M (2 M×8), and 17 a controller for controlling the encoder 12, the decoder 13, the selectors 14*a*, 14*b*, the first memory bank 15 and the second memory bank 16.

It is now assumed that the image data on an original image of A4 size being processed has a volume of 16 M bytes for one color. The original image data is divided into blocks each having 16 bytes (4×4), and the image data for one block is encoded into three-component data having a fixed length. The three components are a reference level for designating a representative tone level which represents the tone level of each pixel in the block, a difference for indicating the distribution range of the representative tone levels in the block, and a resolution component for indicating the representative tone level of each pixel in the block. The size of the three-component data is 6 bytes (48 bits), and the image memory is composed of the memory banks 15 and 16 which have a capacity for storing the data for one color in the original image of A4 size. The data width of the data which is input or output between each memory bank and the image memory is 24 bits. The operation of this circuit in the case of simultaneously executing the encoding and decoding processing for one color of the original image data will now be explained.

When the data on the original image of A4 size is stored in the first memory bank 15, it is encoded in each block of 4×4 by the encoder 12 to obtain encoded data having a data width of 48 bits. The selector 14*a* selects the encoded data outputting side in accordance with a signal from the controller 17. The controller 17 then outputs a signal for writing the data of 8 bits into each of the DRAMs 15*a*, 15*b* and 15*c* each having a data width of 8 bits. This operation is repeated twice, and the data of 48 bits in total is thus stored in the first memory bank 15.

When the operation of reading and decoding the encoded data stored in the first memory bank 15 and the operation of storing the next data on the original image of A4 size in the second memory bank 16 are simultaneously executed, the selector 14*b* selects the encoded data outputting side in accordance with a signal from the controller 17 so as to write data of 48 bits which are encoded by the encoder 12. The controller 17 then outputs a signal for writing the data of 8 bits into each of the DRAMs 16*a*, 16*b* and 16*c* each having a data width of 8 bits. This operation is repeated twice, and the data of 48 bits in total is thus stored in the second memory bank 16.

Simultaneously with the operation of storing the encoded data in the second memory bank 16, the encoded data stored in the first memory bank 15 are read out and decoded. The selector 14*a* selects the encoded data readout side in accordance with a signal from the controller 17. The controller 17 then outputs a signal for reading the encoded data of 24 bits which are stored in the DRAMs 16*a*, 16*b* and 16*c*. This operation is repeated twice, so that the encoded data for one block of 48 bits in total is read out. Similarly, the operation of reading and encoding the encoded data stored in the second memory bank 16 and the operation of storing the next data on the original image of the A4 size in the first memory bank 15 are simultaneously executed. In this way, the controller 17 controls the encoder 12 and the decoder 13 so as not to simultaneously access the same memory bank.

When the data on an original image of A3 size is encoded and stored in the image memory, the selectors 14*a* and 14*b* select the encoded data output side in accordance with a signal from the controller 17. The controller 17 then outputs a writing signal for writing the data into each of the DRAMs of the first memory bank 15 and the second memory bank 16. When the encoded data on the image of A3 size which are stored in the first memory bank 15 and the second memory bank 16 are read out and decoded, the selectors 14*a* and 14*b* select the encoded data readout side in accordance with a signal from the controller 17. The controller 17 then outputs a reading signal for reading the data from the DRAMs of the first memory bank 15 and the second memory bank 16. In processing the image data of the A3 size, the controller 17 exclusively controls the operation of writing the data from the encoder 12 and the operation of supplying the data to the decoder 13 with respect to both memory banks.

In processing the image data of A3 size, the first memory bank 15 and the second memory bank 16 may be treated as one continuous area in the operation of storing and reading the encoded data in and from both memory banks 15, 16 by selecting the first memory bank 15 first and then selecting the second memory bank 16 after a series of processing steps are finished. Alternatively, the controller 17 may simultaneously select both memory banks 15, 16 so as to use the data lines of both memory banks each having a data line of 24 bits wide as one data line having a width of 48 bits. That is, the first and second memory banks 15, 16 may be treated as one area having a data width of 48 bits. For example, in the case of storing the encoded data for one block of 48 bits, the first 24 bits are written into the first memory bank 15 and the remaining 24 bits are written into the second memory bank 16 at the same time under the control of the controller 17.

Embodiment 2-2

In this embodiment, the image memory of Embodiment 2-1 is divided into three or more memory banks. The controller 17 may simultaneously select three or more memory banks 15, 16 so as to use the data lines of all memory banks as one data line having a width of 48 bits. However, it is more efficient in practical use to have the image memory composed of two memory banks.

Embodiment 2-3

In Embodiment 2-1, the original image data is divided into blocks each having 16 bytes and each item of the encoded data has 6 bytes, but in this embodiment, if the encoded data have a fixed length, the block size and the size of the encoded data may be selected at will.

Embodiment 2-4

In Embodiment 2-1, when the image data of A4 size is stored or read in and from each memory bank, the encoded data of 48 bits are divided into two parts, and each of the storing and reading operations is repeated twice through the data line having a width of 24 bits. This embodiment enables only one access to each memory bank by using a data line having a width of 48 bits. Alternatively, the embodiment may have a structure which require three or more accesses to each memory bank for the storing and reading operation.

Embodiment 2-5

In Embodiment 2-1, the image memory stores the data for one color. In this embodiment, data for a plurality of colors is processed as the data for one screen. The data for a plurality of colors may be simultaneously controlled in parallel.

As explained above in Embodiments 2-1 to 2-5, according to an image compression and expansion apparatus of the present invention for temporarily storing data for an original image which is encoded into data having a fixed length and editing the data while reading and decoding the encoded data, since the image memory is composed of memory banks having a structure which corresponds to the structure of the encoded data, and the encoding and decoding operations are exclusively controlled with respect to the same memory bank in the image memory, encoding and decoding operations are possible at the same time without the need for complicated memory control.

In addition, since the image memory is composed of memory banks having a structure which corresponds to the structure of the encoded data, and a plurality of memory banks are controlled in parallel, it is possible to increase the data width of the image memory and reduce the number of accesses to the image memory, thereby enabling high-speed processing.

Embodiment 3-1

Figure 5:
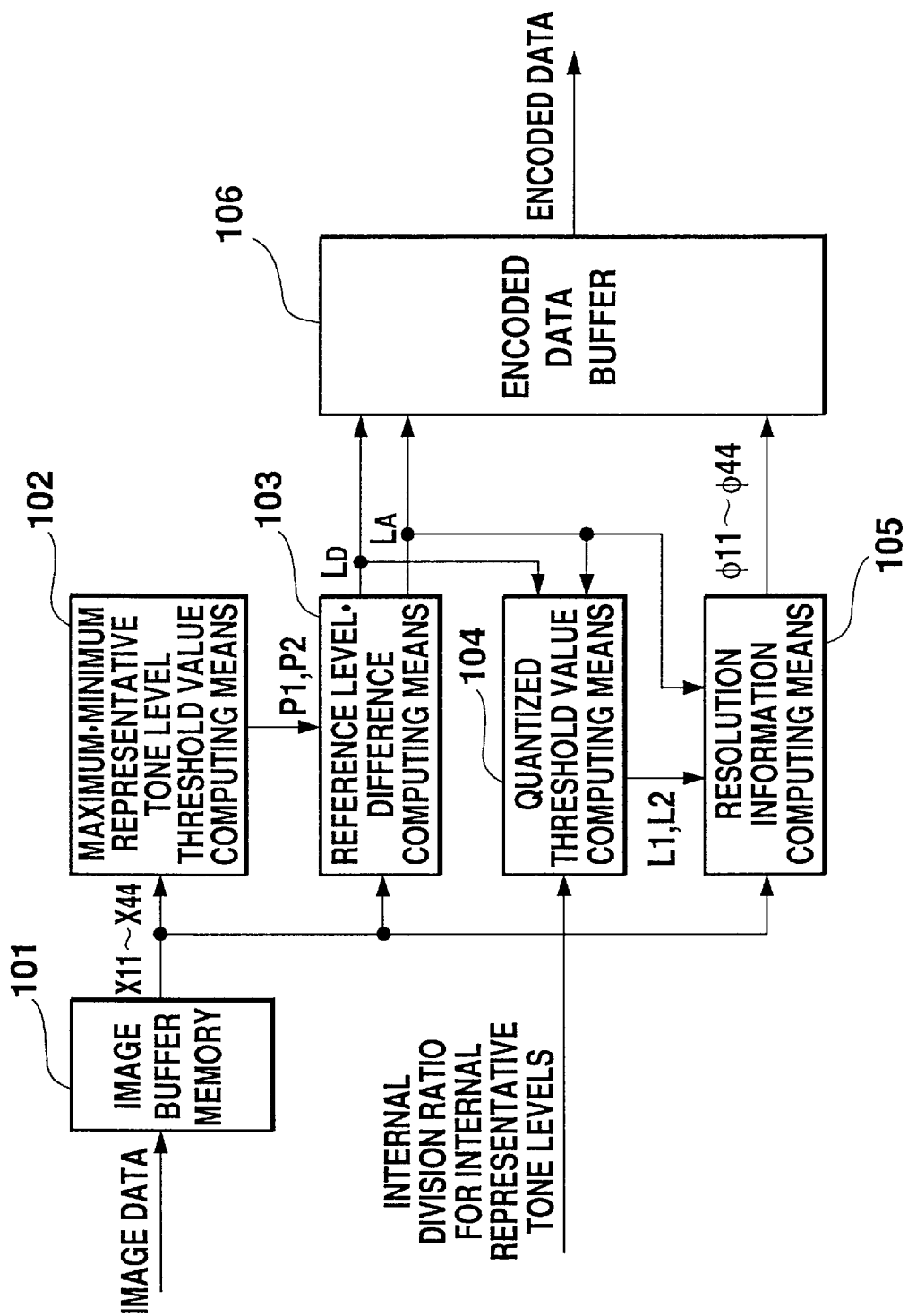
FIG. 5 shows the structure of the encoding circuit in an embodiment of an encoding apparatus according to the present invention.

FIG. 5 shows the structure of the encoding circuit in an embodiment of an encoding apparatus according to the present invention. In FIG. 5, the reference numeral 101 represents an image buffer memory for converting the image data which are input with the data for one line as a unit into blocks of data (X11 to X44), each block having 4×4 pixels, 102 a maximum and minimum representative tone level threshold value computing means for extracting the maximum tone level ($L_{max}$) and the minimum tone level ($L_{min}$) in the block and computing the threshold values (P2, P1) for obtaining the maximum•minimum representative tone levels, 103 a reference level•difference computing means for obtaining the maximum and minimum representative tone levels (Q4, Q1) on the basis of the image data of the block (X11 to X44) and the threshold values (P2, P1) and further obtaining the reference level (LA) and the difference (LD), 104 a quantized threshold value computing means for computing the quantized threshold values (L2, L1) from the reference level (LA), the difference (LD) and the internal division ratio for internal representative tone levels which is designated by an external equipment, 105 a resolution information computing means for quantizing the image data (X11 to X44) on the basis of the quantized threshold values (L2, L1) and the reference level (LA), and obtaining resolution information ($\phi$11 to $\phi$44), and 106 an encoded data buffer for storing the reference level (LA), the difference (LD) and the resolution information ($\phi$11 to $\phi$44) and serially outputting them as encoded data.

Figure 11:
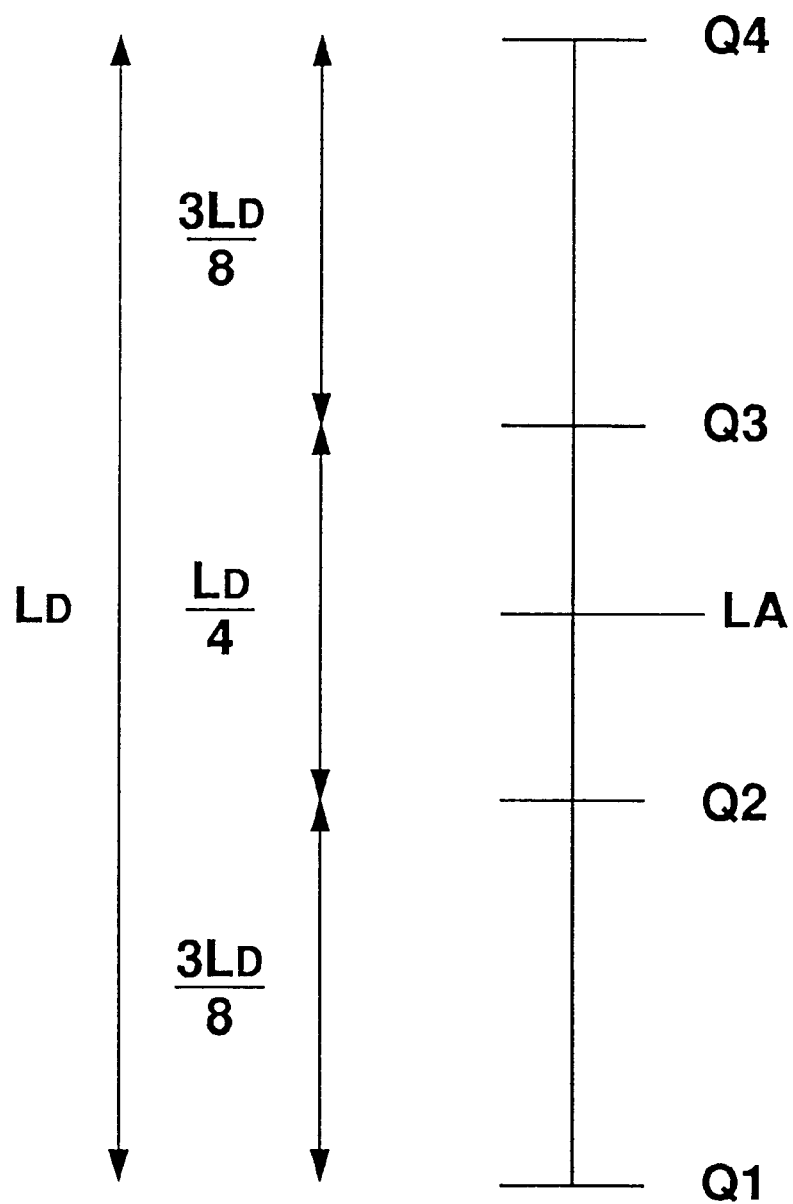
FIG. 11 shows an example of the internal division ratio for internal representative tone levels used in the embodiment shown in FIG. 5 and the embodiment shown in FIG. 6.
Figure 22:
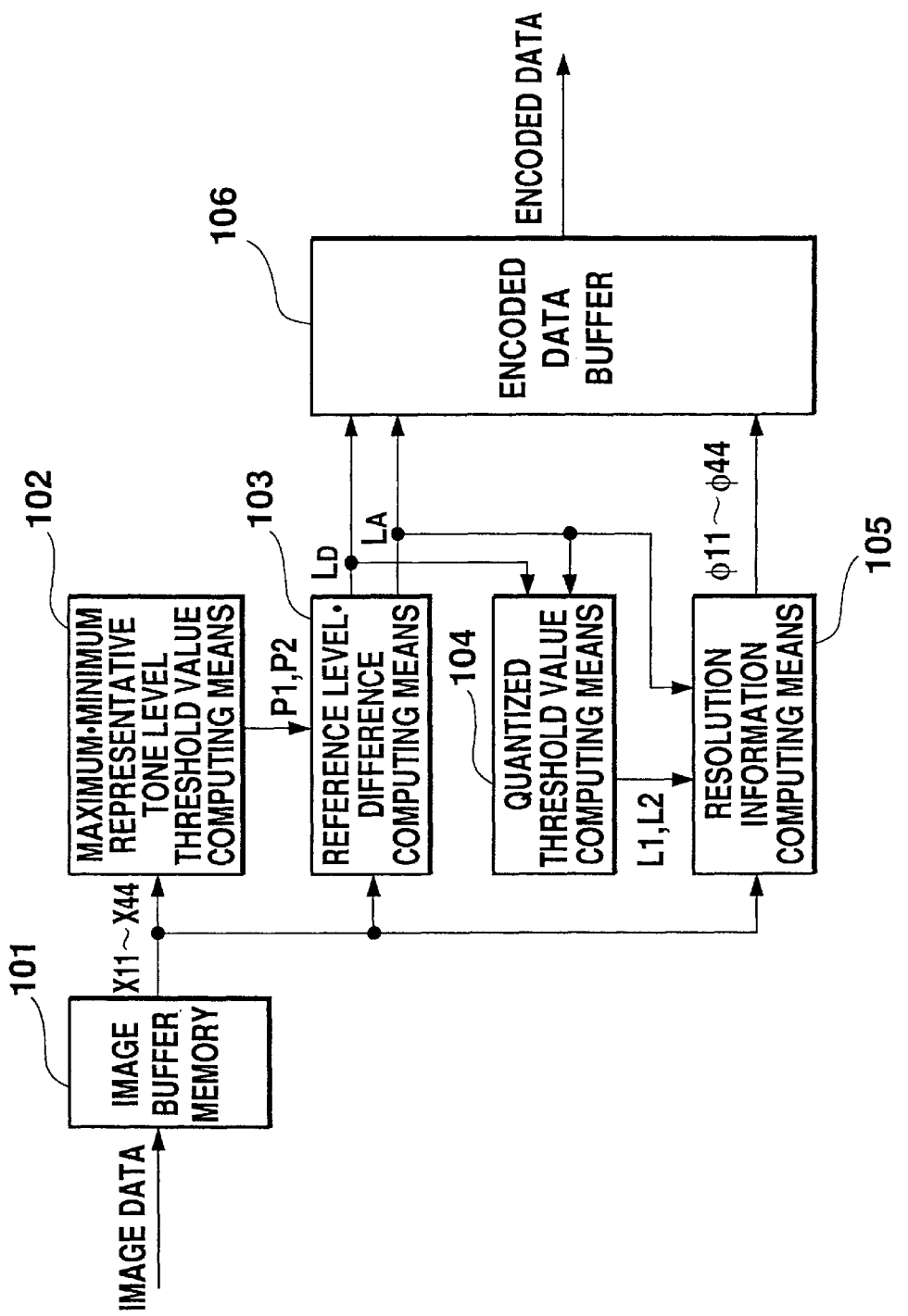
FIG. 22 shows the structure of an encoding circuit used in a conventional encoding method.

The operation of the encoding circuit is approximately the same as that of the conventional encoding circuit shown in FIG. 22 except for the operation of the quantized threshold value computing means 104. The quantized threshold value computing means 104 in this embodiment computes the quantized threshold values (L2, L1) in accordance with a designated internal division ratio for internal representative tone levels. For example, if the internal division ratio for internal representative tone levels shown in FIG. 11 is designated, the quantized threshold values (L2, L1) are computed in accordance with the following formulas (15) and (16).

$$L1 = LA - 5/16 \cdot LD \qquad (15)$$

$$L2 = LA + 5/16 \cdot LD \qquad (16)$$

Figure 12:
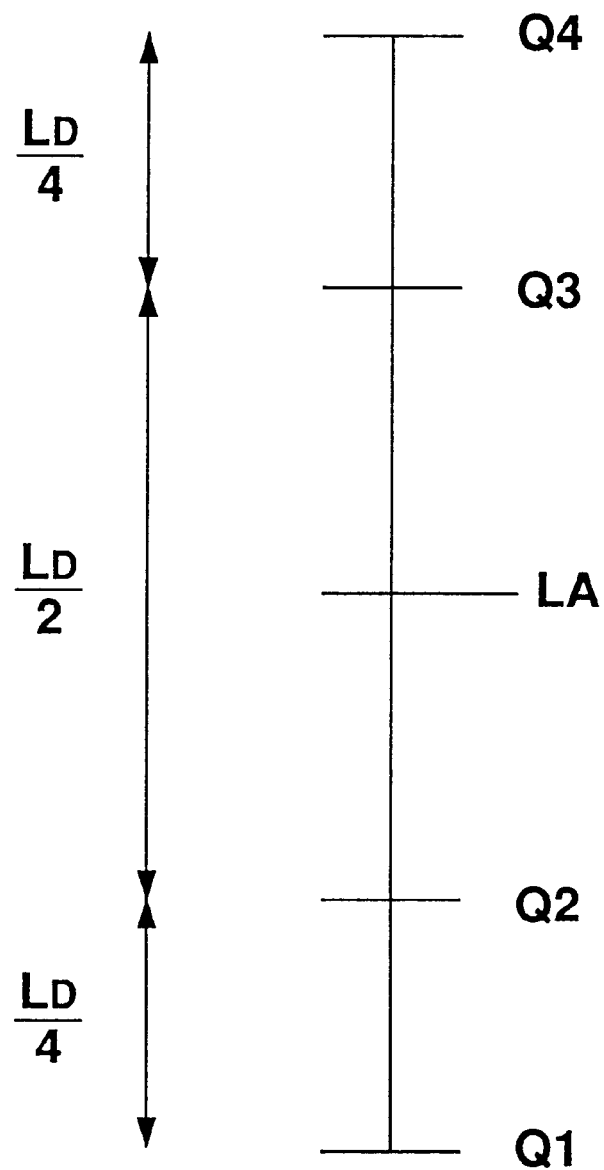
FIG. 12 shows another example of the internal division ratio for internal representative tone levels used in the embodiment shown in FIG. 5 and the embodiment shown in FIG. 6.

If the internal division ratio for internal representative tone levels shown in FIG. 12 is designated, the quantized threshold values (L2, L1) are computed in accordance with the following formulas (17) and (18).

$$L1 = LA - 3/8 \cdot LD \qquad (17)$$

$$L2 = LA + 3/8 \cdot LD \qquad (18)$$

In setting the internal division ratio for internal representative tone levels, the encoding circuit selects a value which reduces the quantization error as much as possible by, for example, investigating the distributed state of the tone levels of the image in advance. As the internal division ratio for internal representative tone levels, a fixed value may be used in the system, or the optimum value may be selected for each image. In this case, the same internal division ratio for internal representative tone levels is naturally used in the encoding circuit and the decoding circuit.

As to the coefficient 5/16 used in the formulas (15) and (16), 5/16=1/4+1/16. As to the coefficient 3/8 used in the formulas (17) and (18), 3/8=1/4+1/8. In both cases, the coefficient is obtained by adding fractions each having the n-th power of 2 as a denominator and 1 as a numerator, so that the operation is realized only by shifting and addition in the binary operation, thereby obviating division processing.

Embodiment 3-2

Figure 6:
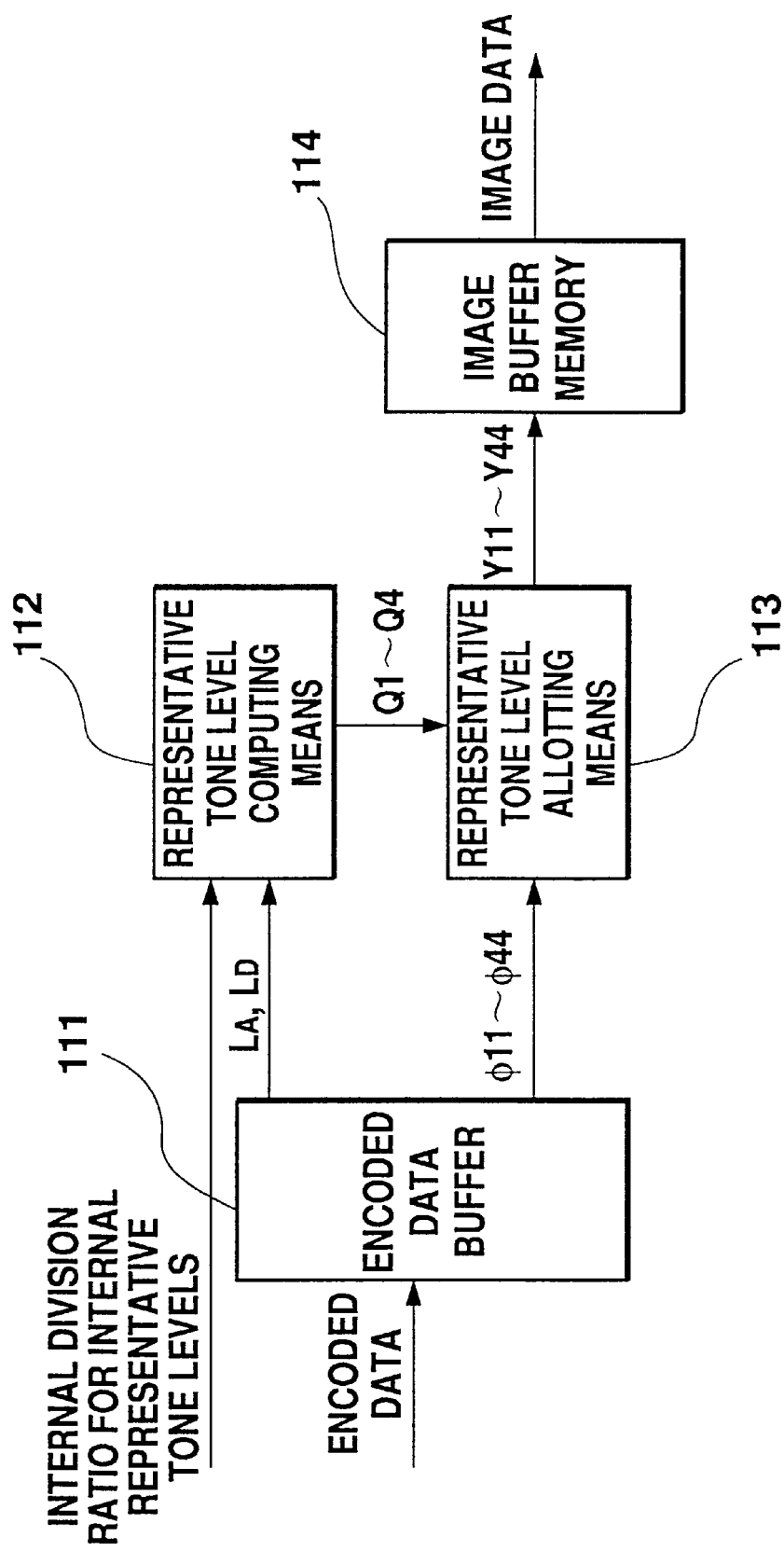
FIG. 6 shows the structure of the decoding circuit in an embodiment of a decoding apparatus according to the present invention.

FIG. 6 shows the structure of the decoding circuit in an embodiment of a decoding apparatus according to the present invention. In FIG. 6, the reference numeral 111 represents an encoded data buffer for storing the encoded data and outputting them in the form of the reference level (LA), the difference (LD) and the resolution information ($\phi$11 to $\phi$44), 112 a representative tone level computing means for obtaining the representative tone levels (Q1 to Q4) from the reference level (LA), the difference (LD) and the internal division ratio for internal representative tone levels which is designated by an external equipment 121, 113 a representative tone level allotting means for reproducing the block image data (Y11 to Y44) on the basis of the representative tone levels (Q1 to Q4) and the resolution information ($\phi$11 to $\phi$44), and 114 an image buffer memory for storing the reproduced block data and outputting the image data for each line.

Figure 23:
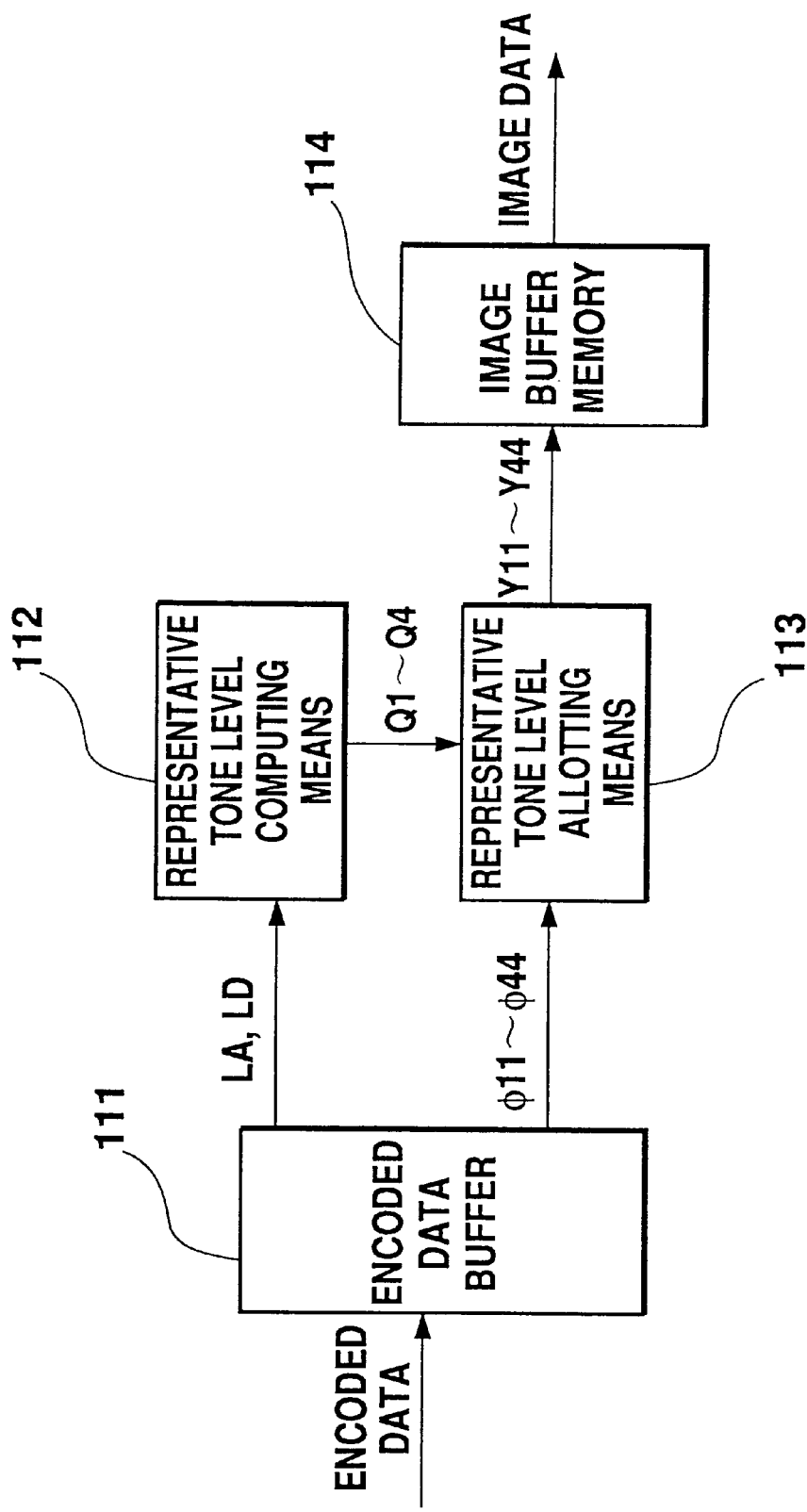
FIG. 23 shows the structure of a decoding circuit used in the conventional encoding method.
Figure 24:
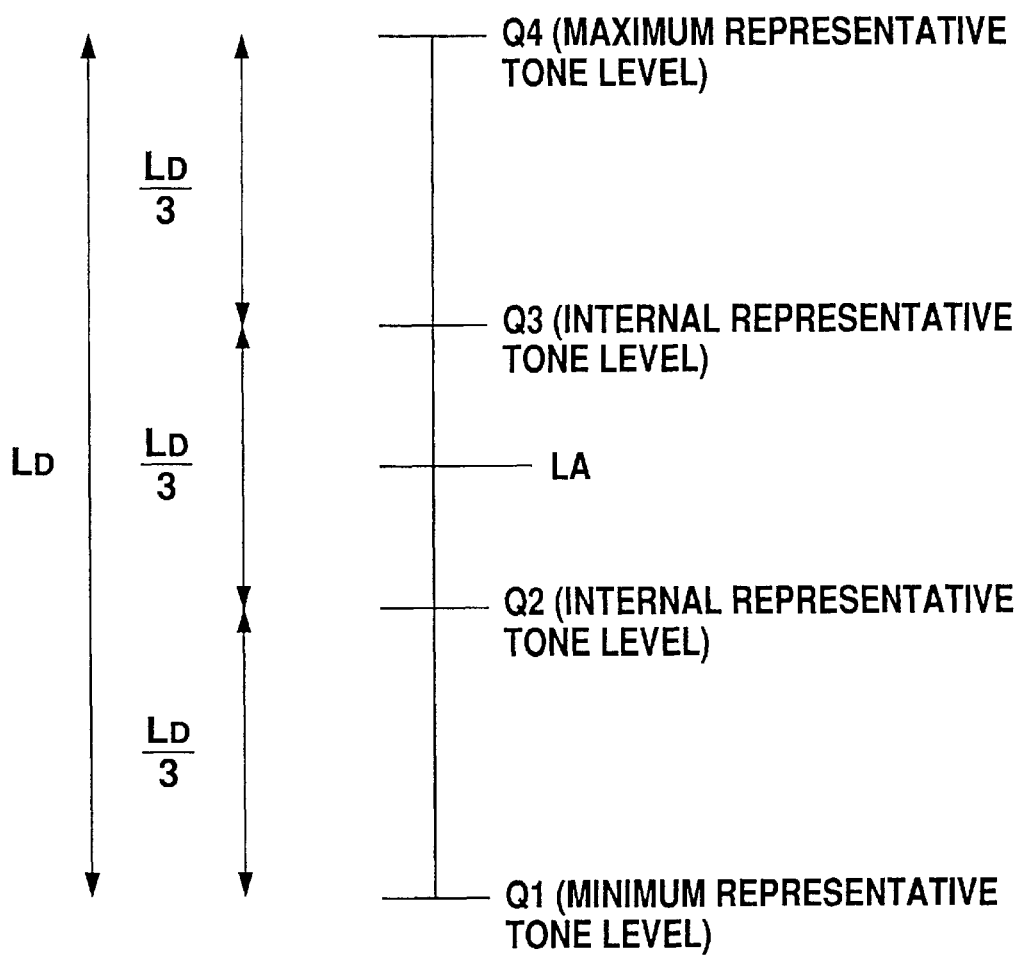
FIG. 24 shows conventional representative tone levels.
Figure 25:
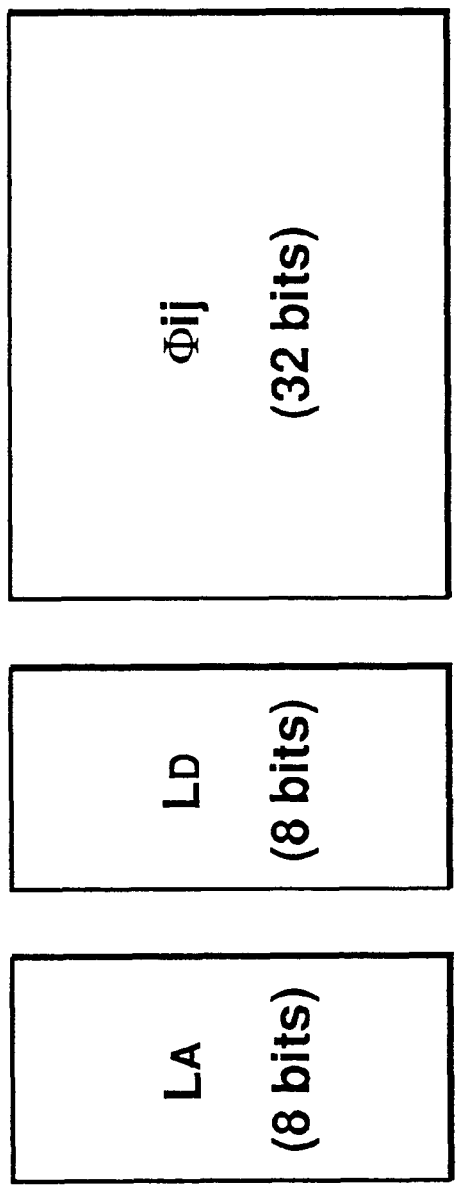
FIG. 25 shows encoded data in the conventional encoding method.

The operation of the decoding circuit is approximately the same as that of the conventional decoding circuit shown in FIG. 23 except for the operation of the representative tone level computing means 112. The representative tone level computing means 112 in this embodiment computes the representative tone levels (Q2, Q3) in accordance with designated internal division ratio for internal representative tone levels. For example, if the internal division ratio for internal representative tone levels shown in FIG. 11 is designated, the representative tone levels (Q2, Q3) are computed in accordance with the following formulas (19) and (20).

$$Q1=LA-LD/8 \quad (19)$$

$$Q3=LA+LD/8 \quad (20)$$

If the internal division ratio for internal representative tone levels shown in FIG. 12 is designated, the representative tone levels (Q2, Q3) are computed in accordance with the following formulas (21) and (21).

$$Q2=LA-LD/4 \quad (21)$$

$$Q3=LA+LD/4 \quad (22)$$

Since both ⅛ and ¼ are fractions each having the n-th power of 2 as a denominator and 1 as a numerator, the operation is realized simply by shifting and addition in the binary operation, thereby obviating division processing.

Embodiment 3-3

Figure 8:
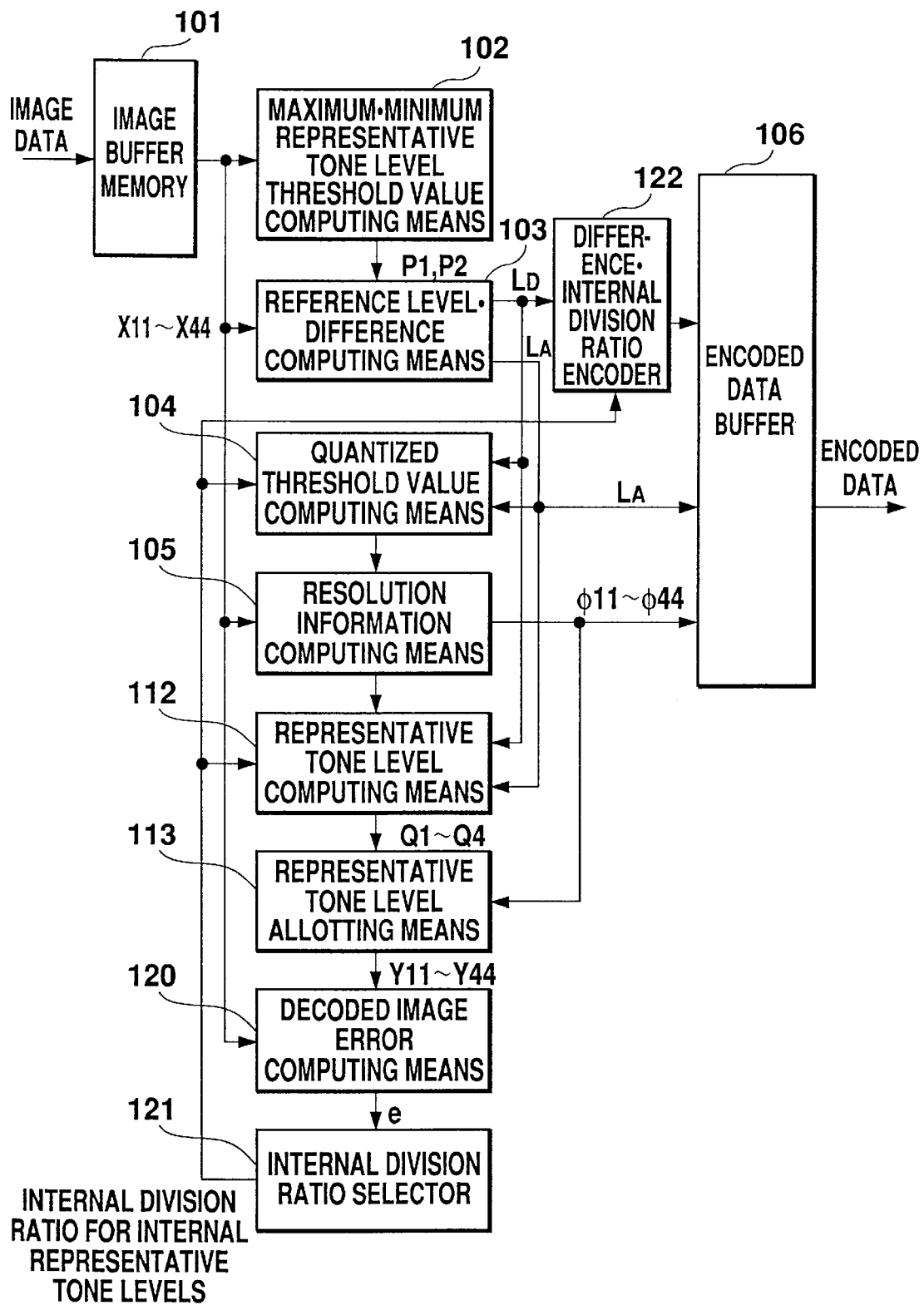
FIG. 8 shows the structure of the encoding circuit in still another embodiment of an encoding apparatus according to the present invention.

FIG. 8 shows the structure of the encoding circuit in another embodiment of an encoding apparatus according to the present invention. In FIG. 8, the reference numeral 101 represents an image buffer memory for converting the image data which are input with the data for one line as a unit into blocks of data (X11 to X44), each block having 4×4 pixels, 102 a maximum and minimum representative tone level threshold value computing means for extracting the maximum tone level ($L_{max}$) and the minimum tone level ($L_{min}$) in the block and computing the threshold values (P2, P1) for obtaining the maximum•minimum representative tone levels, 103 a reference level•difference computing means for obtaining the maximum and minimum representative tone levels (Q4, Q1) on the basis of the image data of the block (X11 to X44) and the threshold values (P2, P1) and further obtaining the reference level (LA) and the difference (LD), 104 a quantized threshold value computing means for computing the quantized threshold values (L2, L1) from the reference level (LA), the difference (LD) and the internal division ratio for internal representative tone levels which is designated by an internal division ratio selector 121, and 105 a resolution information computing means for quantizing the image data (X11 to X44) on the basis of the quantized threshold values (L2, L1) and the reference level (LA), and obtaining resolution information ($\phi11$ to $\phi44$).

The reference numeral 112 represents a representative tone level computing means for obtaining the representative tone levels (Q1 to Q4) from the reference level (LA), the difference (LD) and the internal division ratio for internal representative tone levels which is designated by the internal division ratio selector 121, 113 a representative tone level allotting means for locally reproducing the block image data (Y11 to Y44) on the basis of the representative tone levels (Q1 to Q4) and the resolution information ($\phi11$ to $\phi44$), 120 a decoded image error computing means for computing an error (e) between the locally reproduced image data (Y11 to Y14) and the original image data (X11 to X44), 121 the internal division ratio selector for selecting the, optimum internal division ratio for internal representative tone levels on the basis of the calculated error (e), 122 a difference•internal division ratio encoder for encoding the difference (LD) and the selected internal division ratio for internal representative tone levels, and 106 an encoded data buffer for storing the reference level (LA), the encoded difference (LD) and internal division ratio for internal representative tone levels, and the resolution information ($\phi11$ to $\phi44$), and serially outputting them as encoded data.

The operation of this embodiment is similar to that of the encoding circuit in Embodiment 3-1, but different in the following points. The image data (Y11 to Y44) is locally reproduced by the representative tone level computing means 112 and the representative tone level allotting means 113. The decoded image error computing means 120 computes the error (e) between the locally reproduced image data (Y11 to Y14) and the original image data (X11 to X44), and the internal division ratio selector 121 selects the optimum internal division ratio for internal representative tone levels on the basis of the calculated error (e). The difference•internal division ratio encoder 122 encodes the selected internal division ratio for internal representative tone levels as well as the difference (LD). There are many methods of computing the error (e) by the decoded image error computing means 120. For example, a method of computing the error (e) by using the absolute value of the error obtained from the following formula (23) is simple.

$$e = \sum_i \sum_j |Xij - Yij| \quad (23)$$

Figure 13:
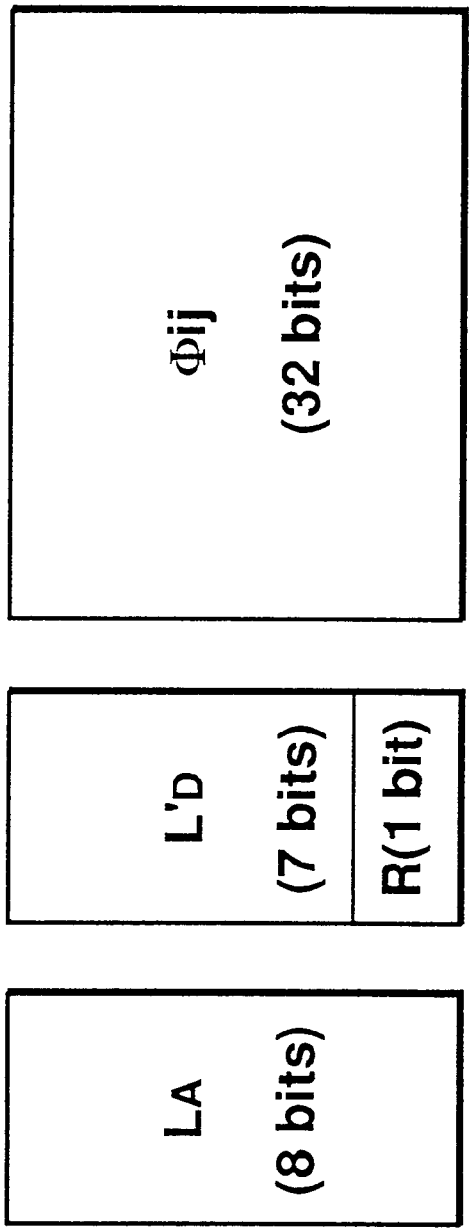
FIG. 13 shows encoded data in the embodiment of an encoding apparatus shown in FIG. 8.

The internal division ratio selector 121 successively produces an internal division ratio for internal representative tone levels, computes the optimum internal division ratio on the basis of the error (e) and finally instructs the difference•internal division ratio encoder 122 to encode the internal division ratio for internal representative tone levels which reduces the error (e) as much as possible. When there are two internal division ratio for internal representative tone levels which can be selected, for example, the difference (LD) of 8 bits is encoded into a difference (LD') of 7 bits, and the internal division ratio (R) for internal representative tone levels is allotted to the remaining 1 bit, as shown in FIG. 13. The simplest method of encoding the difference (LD) is a method of quantizing the difference (LD) to ½, as represented by the following formula (24).

$$LD'=LD/2 \quad (24)$$

Another method of encoding the difference (LD) is a method of using the difference as it is when the difference (LD) is small and quantizing it when the difference (LD) is large, as represented by the following formula (25).

$$\left. \begin{array}{l} \text{if } LD < 64 \\ \quad LD' = LD \\ \text{else} \\ \quad LD = LD/4 + 64 \end{array} \right\} \quad (25)$$

According to this method, since the difference (LD) is not quantized when it is small, an improvement of the picture quality is expected.

Embodiment 3-4

Figure 7:
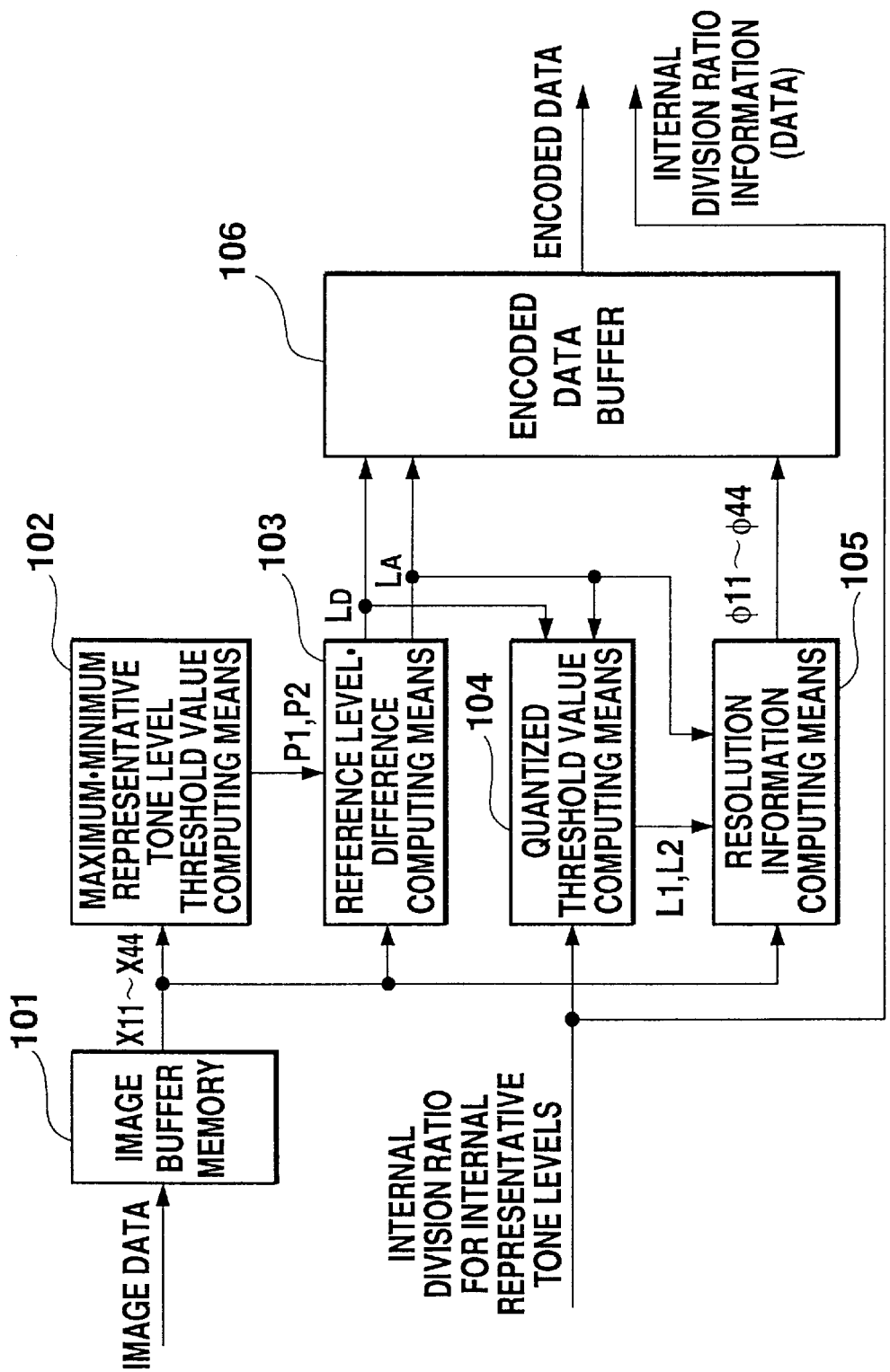
FIG. 7 shows the structure of the encoding circuit in another embodiment of an encoding apparatus according to the present invention.

FIG. 7 shows the structure of the encoding circuit in another embodiment of an encoding apparatus according to the present invention. In Embodiment 3-3, the internal division ratio selector 121 selects the optimum internal division ratio for internal representative tone levels on the basis of the calculated error (e). In this embodiment, the optimum internal division ratio for internal representative tone levels is variably designated by an external equipment.

The selected internal division ratio for internal representative tone levels is not encoded but stored for each block as information.

Embodiment 3-5

Figure 10:
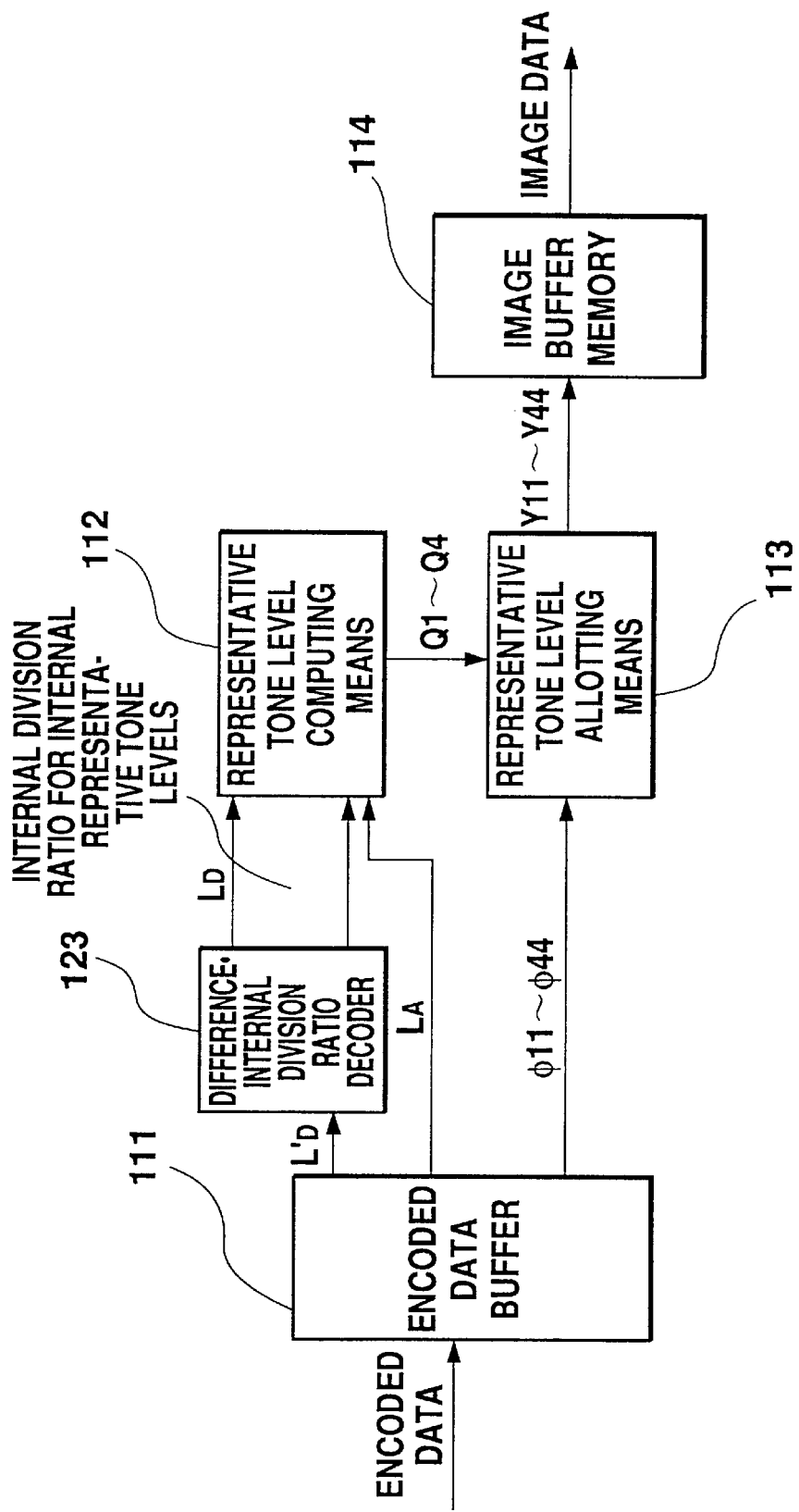
FIG. 10 shows the structure of the decoding circuit in still another embodiment of a decoding apparatus according to the present invention.

Another embodiment of a decoding circuit according to the present invention will be explained. FIG. 10 shows the structure of the decoding circuit which corresponds to the encoding apparatus in Embodiment 3-3. In FIG. 10, the reference numeral 111 represents an encoded data buffer for storing the encoded data and outputting them in the form of the reference level (LA), the encoded data of the difference (LD'), the internal division ratio (R) for internal representative tone levels and the resolution information ($\phi$11 to $\phi$44), 123 a difference•internal division ratio decoder for decoding the difference (LD) and the internal division ratio for internal representative tone levels, 112 a representative tone level computing means for obtaining the representative tone levels (Q1 to Q4) from the reference level (LA), the difference (LD) and the internal division ratio (R) for internal representative tone levels, 113 a representative tone level allotting means for reproducing the block image data (Y11 to Y44) on the basis of the representative tone levels (Q1 to Q4) and the resolution information ($\phi$11 to $\phi$44), and 114 an image buffer memory for storing the reproduced block data and outputting the image data for each line.

The operation of this embodiment is approximately the same as that of the decoding apparatus in Embodiment 3-2 except for the operation of the difference•internal division ratio decoder 123. For example, when the difference is encoded in accordance with the formula (24), it is decoded, in accordance with the following formula (26).

$$LD = 2 \cdot LD' + 1 \qquad (26)$$

when the difference is encoded in accordance with the formula (25), it is decoded, in accordance with the following formula (27).

$$\left. \begin{array}{l} \text{if } LD' < 64 \\ \quad LD = LD' \\ \text{else} \\ \quad LD = 4 \cdot (LD' - 64) + 3 \end{array} \right\} \qquad (27)$$

In this case, the information on the internal division ratio (R) for internal tone levels is added to the difference information in the encoded data, as shown in FIG. 13.

Embodiment 3-6

Figure 14:
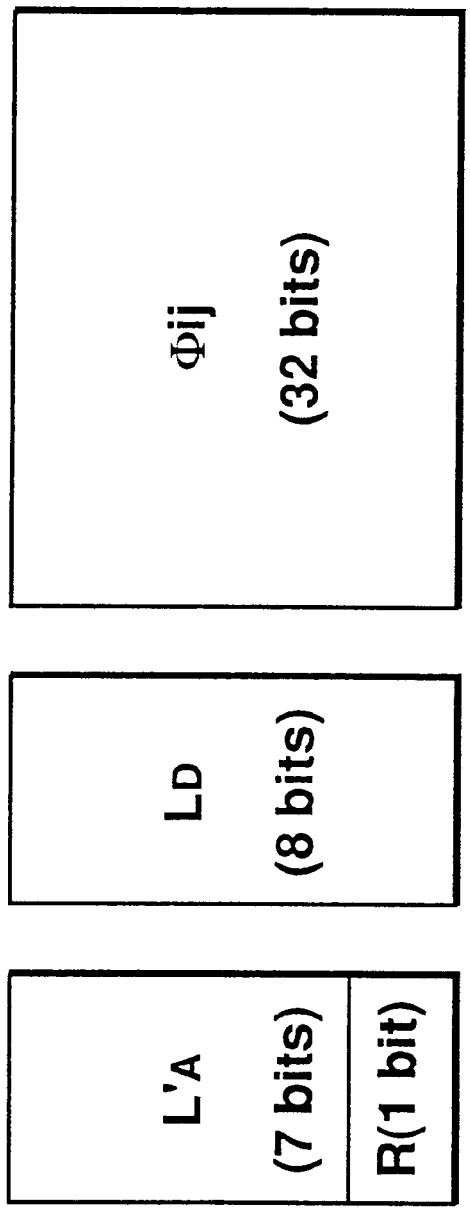
FIG. 14 shows encoded data used in a further embodiment of a decoding apparatus according to the present invention.

In Embodiment 3-5, the information on the internal division ratio is added to the difference information in the encoded data, as shown in FIG. 13. In this embodiment, the reference level information (LA) is encoded into the data (LA') of 7 bits, and the information on the internal division ratio (R) for internal representative tone levels is allotted to the remaining 1 bit, as shown in FIG. 14.

Embodiment 3-7

Figure 9:
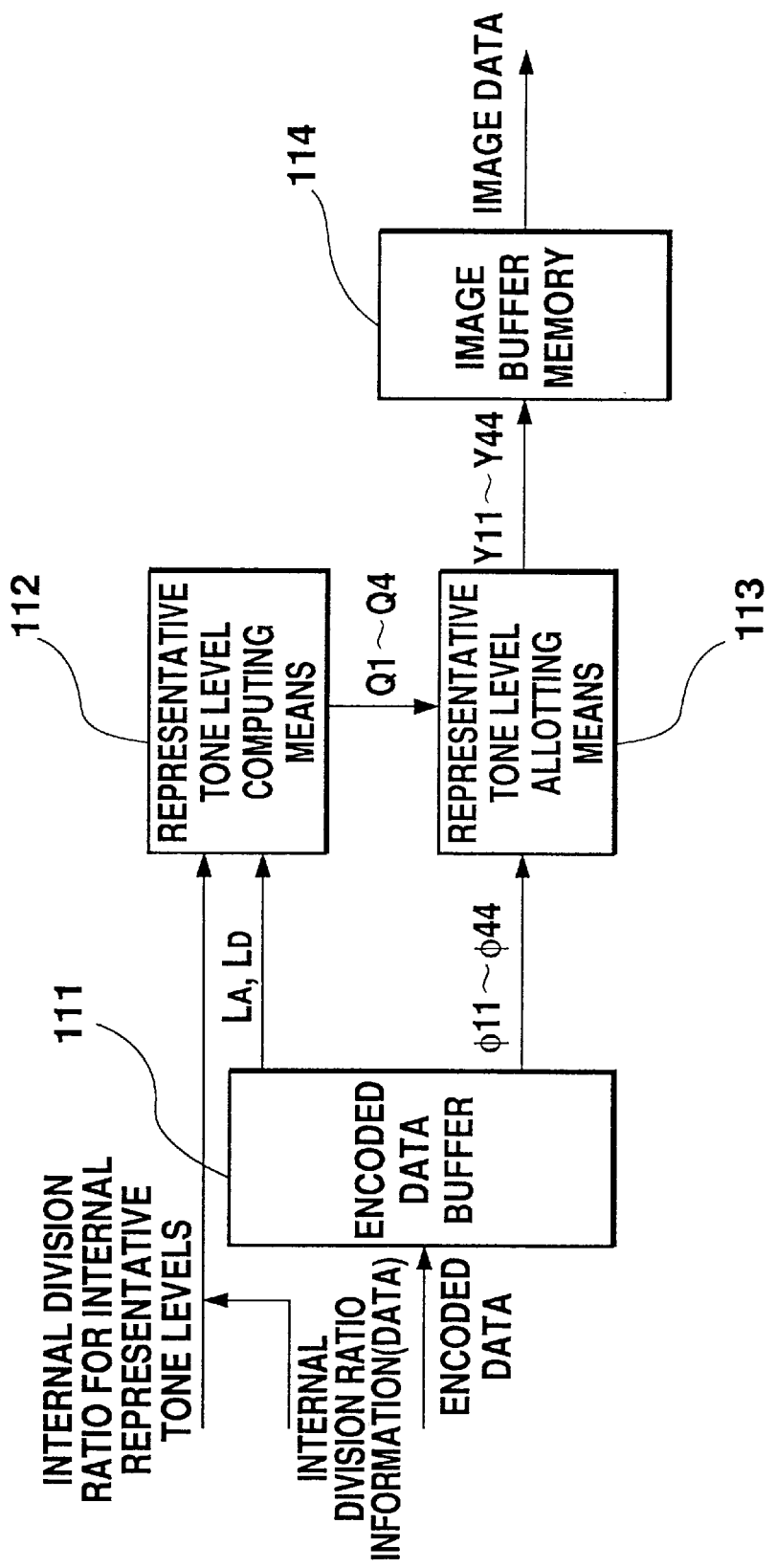
FIG. 9 shows the structure of the decoding circuit in another embodiment of a decoding apparatus according to the present invention.

FIG. 9 shows the structure of the decoding circuit in a further embodiment of a decoding apparatus according to the present invention. In Embodiments 3-5 and 3-6, the internal division ratio (R) for internal representative tone levels which is decoded is used in addition to the encoded data. In this embodiment, the internal division ratio for internal representative tone levels is designated by an external equipment. Alternatively, the information on the internal division ratio for internal representative tone levels which is not encoded but stored for each block may be used.

Embodiment 3-8

Figure 15:
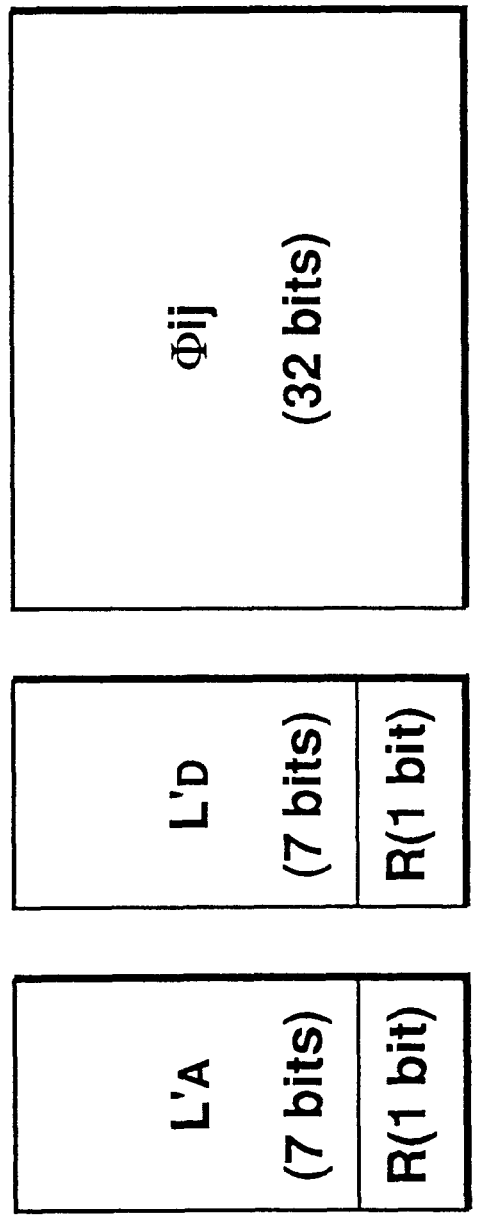
FIG. 15 shows encoded data in a still further embodiment of a decoding apparatus according to the present invention.

In Embodiments 3-5 and 3-6, the information on the internal division ratio (R) for internal representative tone levels is mixed with the reference level information (LA) or the difference information (LD). In this embodiment, the reference level (LA) of 8 bits is encoded into the data (LA') of 7 bits, the difference (LD) of 8 bits is encoded into the data (LD') of 7 bits, and the information on the internal division ratio (R) for internal representative tone levels is mixed with the reference level information and the difference information. In other words, the internal division ratio (R) for internal representative tone levels is allotted to the remaining 2 bits, as shown in FIG. 15. According to this structure, the number of internal representative tone levels which can be selected is increased, so that it is possible to minutely divide the internal representative levels, thereby reducing the deterioration of the picture quality.

Embodiment 3-9

In Embodiments 3-5 and 3-6, the information on the internal division ratio (R) for internal representative tone levels is mixed with the reference level information (LA) or the difference information (LD) and allotted to 1 bit. In this embodiment, the number of internal division ratios (R) for internal representative tone levels which can be selected is increased. When the number of pixels representing a tone level is different between blocks, the quantization error produced in one of the reference level and the difference is used while the other information is held, thereby increasing the number of internal division ratios for internal representative tone levels which can be selected. In this way, the deterioration of the picture quality is reduced. This embodiment is effective when another process using the reference level or the difference is also executed.

Embodiment 3-10

Figure 16:
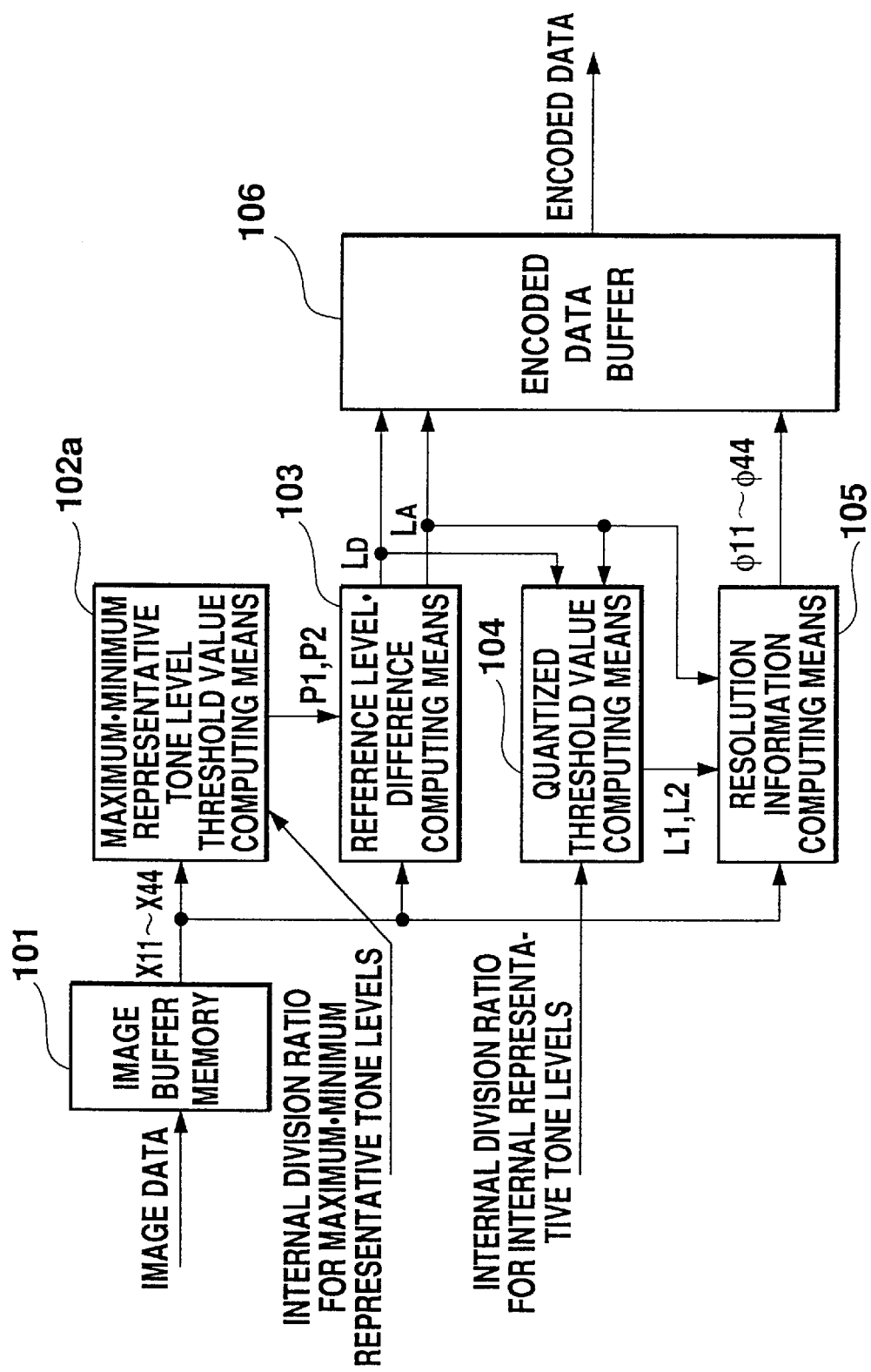
FIG. 16 shows the structure of the encoding circuit in a further embodiment of an encoding apparatus according to the present invention.

FIG. 16 shows the structure of the encoding circuit in still another embodiment of an encoding apparatus according to the present invention. In FIG. 16, the reference numeral 101 represents an image buffer memory for converting the image data which are input with the data for one line as a unit into blocks of data (X11 to X44), each block having 4×4 pixels, 102a a maximum and minimum representative tone level threshold value computing means for extracting the maximum tone level ($L_{max}$) and the minimum tone level ($L_{min}$) in the block and computing the threshold values (P2, P1) for obtaining the maximum•minimum representative tone levels in accordance with the internal division ratio for maximum•minimum representative tone levels which is designated by an external equipment, 103 a reference level•difference computing means for obtaining the maximum and minimum representative tone levels (Q4, Q1) on the basis of the image data of the block (X11 to X44) and the threshold values (P2, P1) and further obtaining the reference level (LA) and the difference (LD), 104 a quantized threshold value computing means for computing the quantized threshold values (L2, L1) from the reference level (LA), the difference (LD) and the internal division ratio for internal representative tone levels which is designated by an external equipment, 105 a resolution information computing means for quantizing the image data (X11 to X44) on the basis of the quantized threshold values (L2, L1) and the reference level (LA), and obtaining resolution information ($\phi$11 to $\phi$44), and 106 an encoded data buffer for storing the reference level (LA), the difference (LD) and the resolution information ($\phi$11 to $\phi$44) and serially outputting them as encoded data.

The operation of this embodiment is approximately the same as that of the encoding apparatus in Embodiment 3-1 except for the operation of the maximum and minimum representative tone level threshold value computing means 102a.

Figure 19:
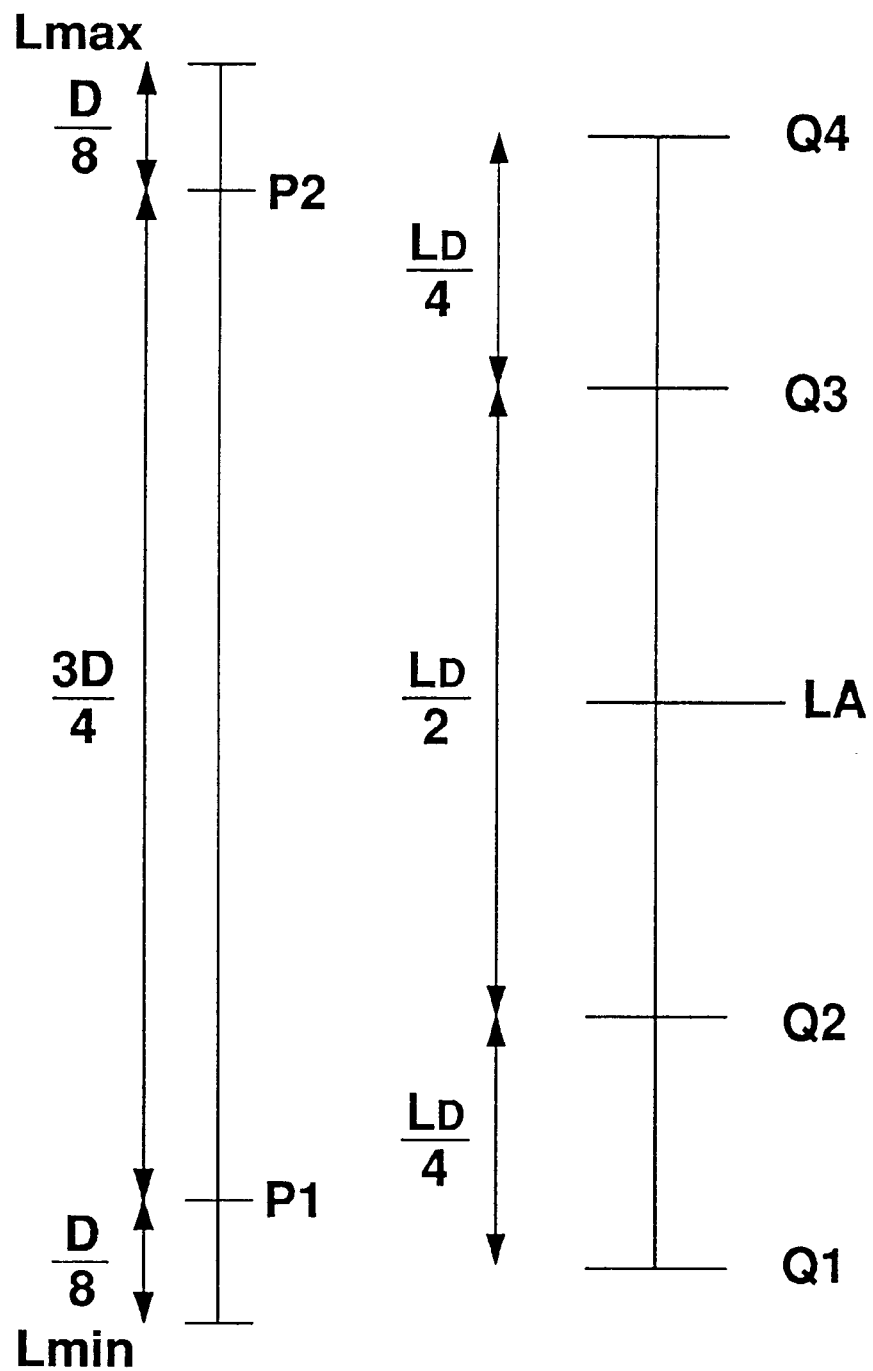
FIG. 19 shows an example of the internal division ratio for maximum•minimum representative tone levels selected for the embodiment shown in FIG. 16.
Figure 20:
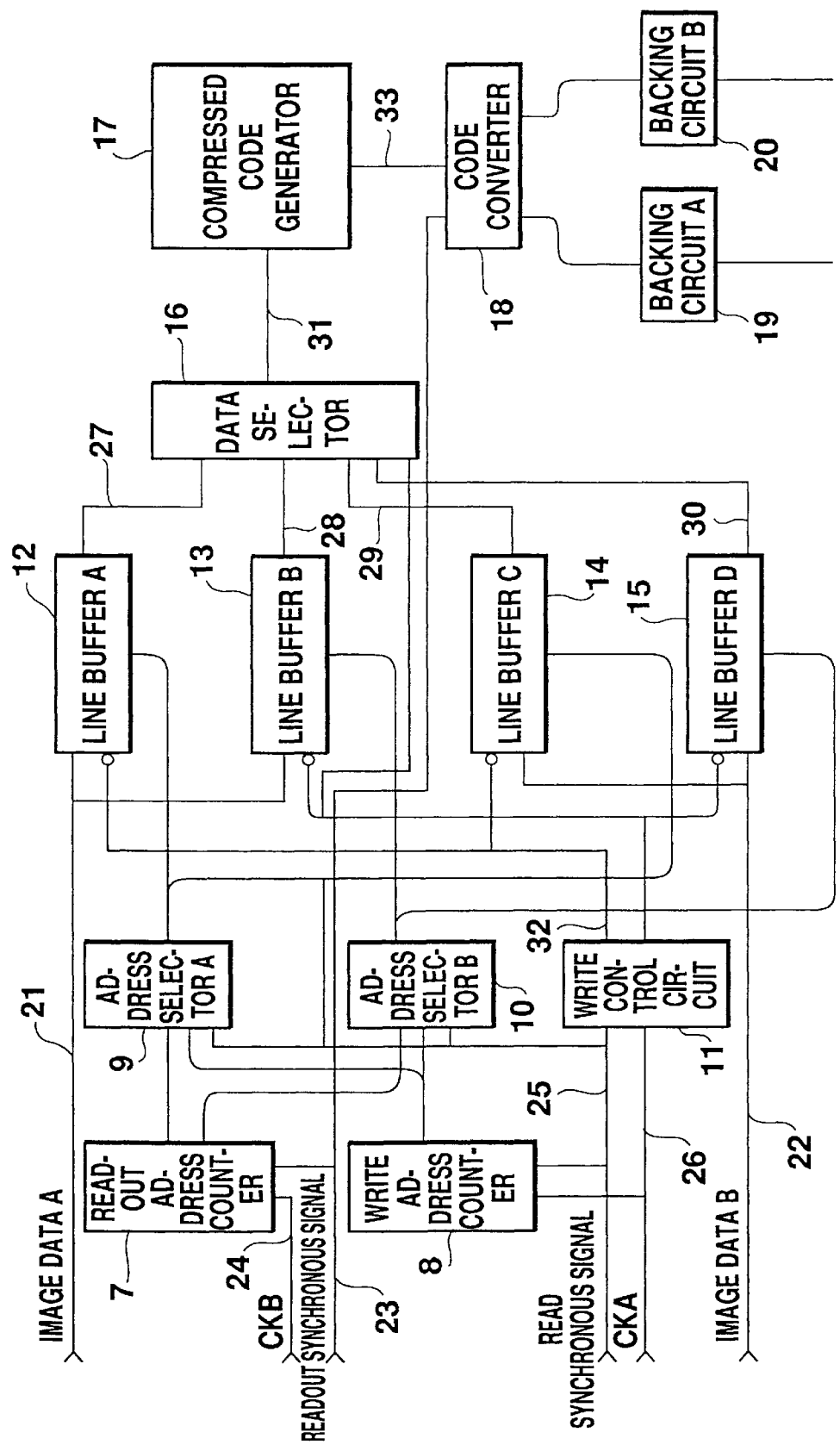
FIG. 20 is a block diagram of a conventional image data compression-expansion circuit.
Figure 21:
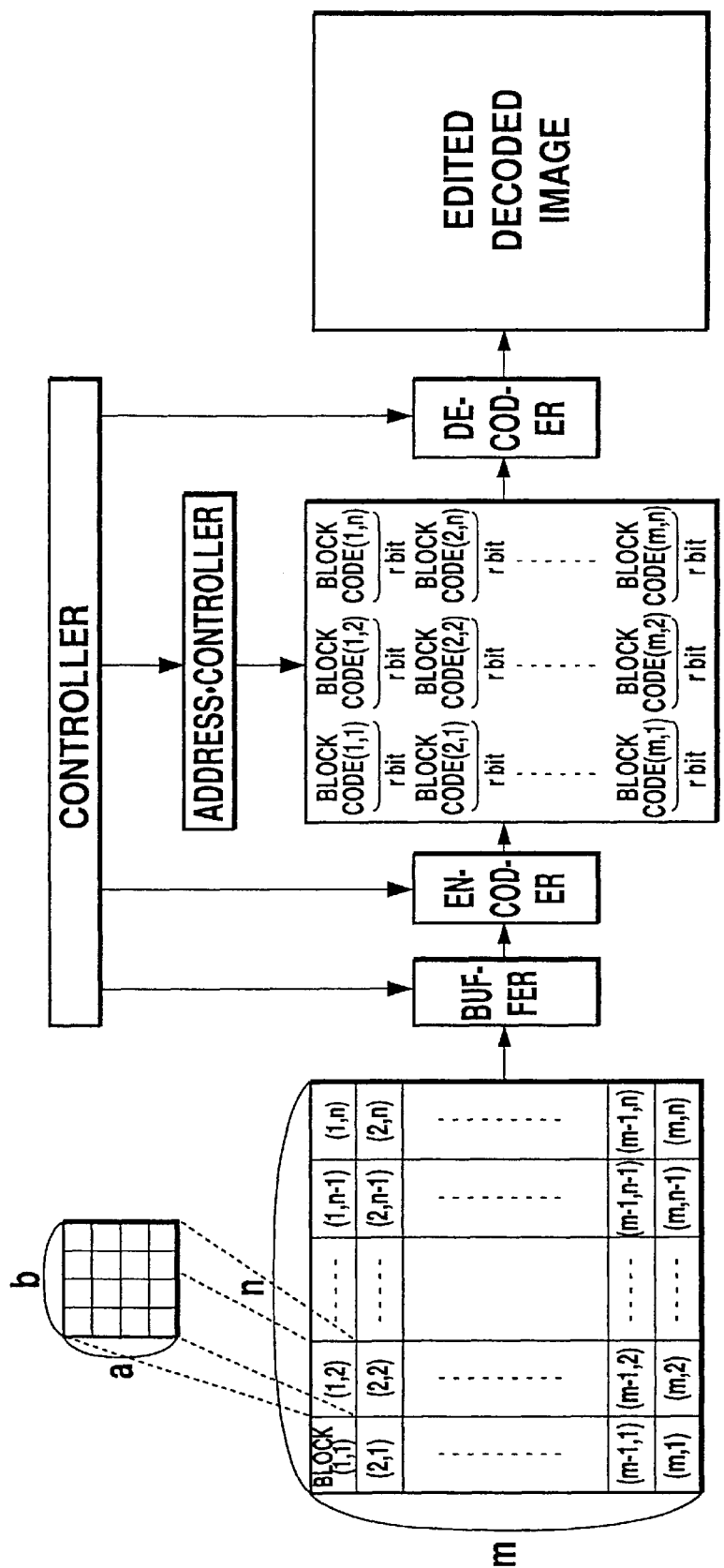
FIG. 21 is a block diagram of a conventional compressed image memory control circuit.

The maximum and minimum representative tone level threshold value computing means 102a calculates the threshold values (P2, P1) for obtaining the maximum•minimum tone levels in accordance with the designated internal division ratio for maximum•minimum representative tone levels. For example, when the internal division ratio for maximum•minimum representative tone levels shown in FIG. 19 is designated, the threshold values (P2, P1) for obtaining the maximum•minimum tone levels are computed in accordance with the following formulas (28) and (29).

$$P1 = (L_{max} + 7L_{min})/8 \tag{28}$$

$$P2 = (7L_{max} + L_{min})/8 \tag{29}$$

On the basis of the threshold values (P2, P1) obtained, the maximum and minimum representative tone levels are obtained from the formulas (3) and (4). The quantized threshold values (L2, L1) are computed in accordance with the designated internal division ratio for internal representative tone levels in the same way as in Embodiment 3-1.

Since the range which is represented by the maximum tone level or the minimum tone level is variable in accordance with the distribution of the tone levels, the quantization error of the pixels in the range which is represented by the maximum tone level or the minimum tone level is reduced, which leads to an improvement of the picture quality.

Particularly, when the distribution range of the tone levels of the pixels in the range which is represented by the maximum tone level or the minimum tone level and in which a change in the number of pixels representing a tone level is easily visually recognized, it is possible to reduce the difference between the maximum representative tone level or the minimum representative tone level and the tone levels of the pixels in that range by reducing range. Thus, the deterioration of the picture quality is reduced.

The decoding method of the encoded data in this embodiment is the same as in Embodiment 3-2.

Embodiment 3-11

Figure 17:
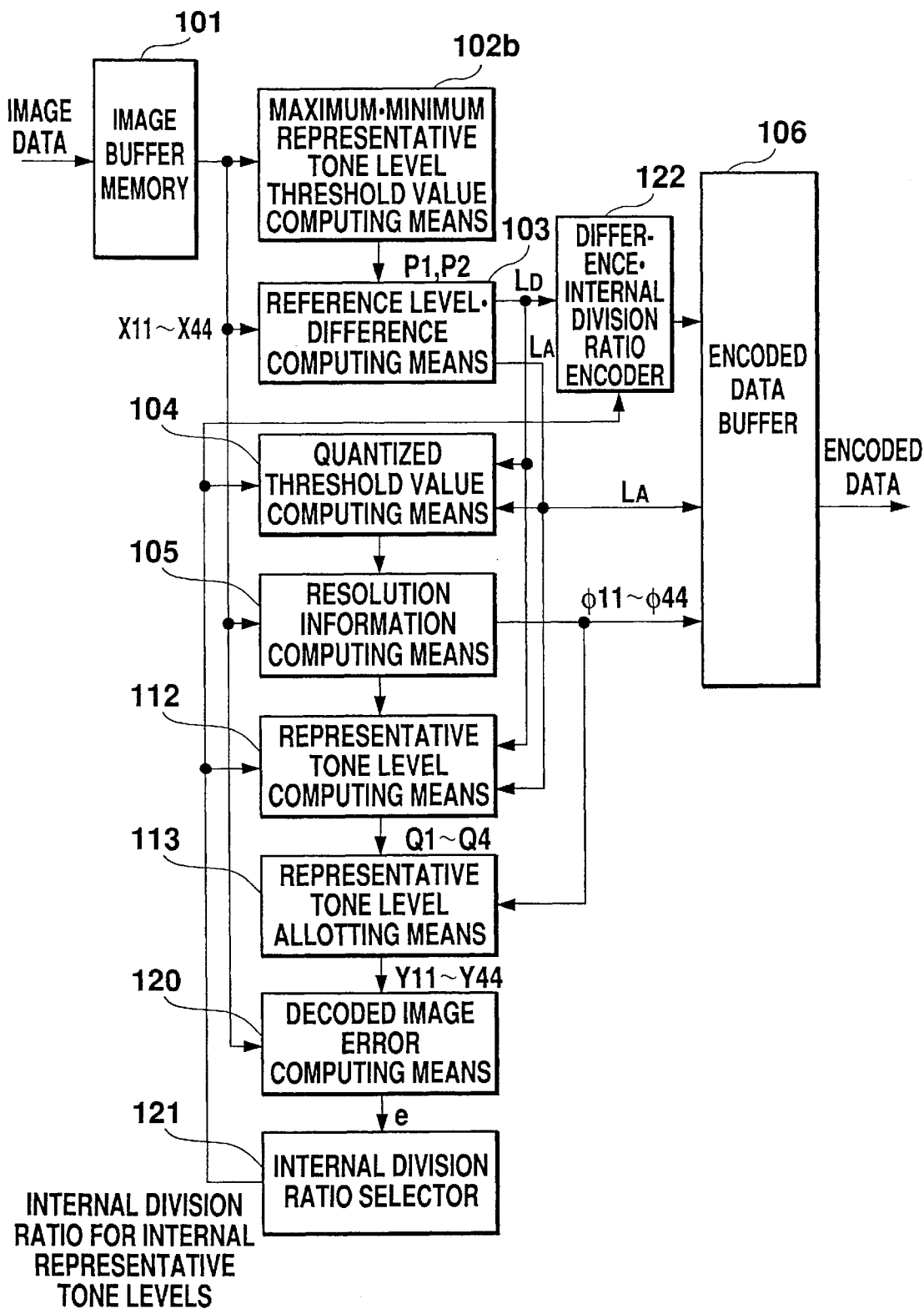
FIGS. 17 and 18 show the structure of the encoding circuit in a still further embodiment of an encoding apparatus according to the present invention.
Figure 18:
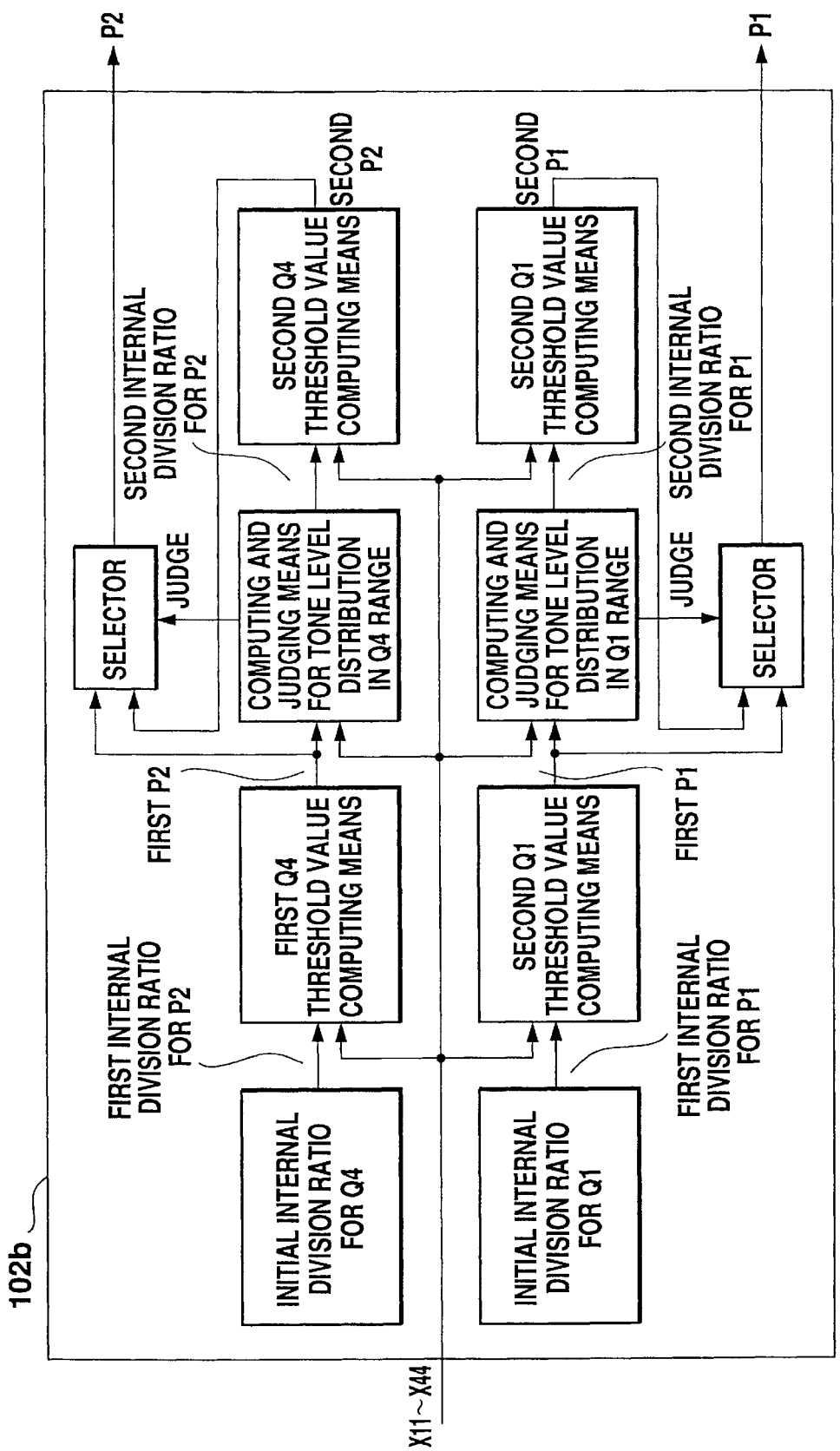

FIGS. 17 and 18 show the structure of the encoding circuit in a further embodiment of an encoding apparatus according to the present invention. In FIG. 17, the reference numeral 101 represents an image buffer memory for converting the image data which are input with the data for one line as a unit into blocks of data (X11 to X44), each block having 4×4 pixels, and 102b represents a maximum and minimum representative tone level threshold value computing means for extracting the maximum tone level ($L_{max}$) and the minimum tone level ($L_{min}$) in the block and computing the threshold values (P2, P1) for obtaining the maximum•minimum representative tone levels in accordance with the internal division ratio for maximum•minimum representative tone levels which is designated in advance, extracting the maximum tone level and the minimum tone level of the pixels in each of the ranges represented by the maximum and minimum representative tone levels, obtaining the difference between the maximum tone level and the minimum tone level in each range, and re-computing the threshold values (P2, P1) while changing the internal division ratio for maximum•minimum representative tone levels so that the range of the maximum or minimum representative tone level is reduced, when the difference in the tone level is greater than a predetermined value.

The reference numeral 103 represents a reference level•difference computing means for obtaining the maximum and minimum representative tone levels (Q4, Q1) on the basis of the image data of the block (X11 to X44) and the threshold values (P2, P1) and further obtaining the reference level (LA) and the difference (LD), 104 a quantized threshold value computing means for computing the quantized threshold values (L2, L1) from the reference level (LA), the difference (LD) and the internal division ratio for internal representative tone levels which is designated by an internal division ratio selector 121, and 105 a resolution information computing means for quantizing the image data (X11 to X44) on the basis of the quantized threshold values (L2, L1) and the reference level (LA), and obtaining resolution information ($\phi11$ to $\phi44$).

The reference numeral 112 represents a representative tone level computing means for obtaining the representative tone levels (Q1 to Q4) from the reference level (LA), the difference (LD) and the internal division ratio for internal representative tone levels which is designated by the external equipment 121, 113 a representative tone level allotting means for locally reproducing the block image data (Y11 to Y44) on the basis of the representative tone levels (Q1 to Q4) and the resolution information ($\phi11$ to $\phi44$), 120 a decoded image error computing means for computing an error (e) between the locally reproduced image data (Y11 to Y14) and the original image data (X11 to X44), 121 the internal division ratio selector for selecting the optimum internal division ratio for internal representative tone levels on the basis of the calculated error (e), 122 a difference•internal division ratio encoder for encoding the difference (LD) and the selected internal division ratio for internal representative tone levels, and 106 an encoded data buffer for storing the reference level (LA), the encoded difference (LD) and internal division ratio for internal representative tone levels, and the resolution information ($\phi11$ to $\phi44$), and serially outputting them as encoded data.

The operation of this embodiment is approximately the same as that of the encoding apparatus in Embodiment 3-3 except for the operation of the maximum and minimum representative tone level threshold value computing means 102b. The maximum and minimum representative tone level threshold value computing means 102b calculates the threshold values (P2, P1) for obtaining the maximum•minimum tone levels while varying the internal division ratio for maximum•minimum representative tone levels in accordance with the distribution of the tone levels of the pixels in the range which is represented by the maximum representative tone level or the minimum representative tone level. When the difference in the maximum tone level and the minimum tone level of the pixels in the range represented by the maximum or minimum representative tone level is greater than a predetermined value, the internal division ratio for maximum•minimum representative tone levels is changed so that the range of the maximum or minimum representative tone level is reduced, and the threshold values (P2, P1) are computed again in accordance with the changed internal division ratio for maximum.minimum representative tone levels. On the basis of the threshold values obtained in this way, the maximum•minimum representative tone levels are obtained.

In this way, especially, when the distribution range of the tone levels of the pixels is large in the range represented by the maximum representative tone level or the minimum representative tone level and in which a change in the number of pixels representing a tone level is easily visually recognized, it is possible to reduce the difference between the maximum representative tone level or the minimum representative tone level and the tone level of the pixels in that range by reducing the range in accordance with the distribution. Thus, the deterioration of the picture quality is reduced.

The threshold values (P2, P1) for obtaining the maximum•minimum tone levels may have either the same ratio as in formulas (28) and (29) or different ratios as in the following formulas (30) and (31).

$$P1=(L_{max}+3L_{min})/4 \quad (30)$$

$$P2=(14L_{max}+L_{min})/16 \quad (31)$$

As explained in Embodiments 3-1 to 3-11, according to the present invention, the encoding or decoding apparatus is provided with the representative tone levels except the maximum representative tone level and the minimum representative tone level are set to values obtained by internally dividing the interval between the maximum representative tone level and the minimum representative tone level by the internal division ratio for internal representative tone levels which is variably designated by an external equipment, and a means for encoding the information of the internal division ratio for internal representative tone levels for each block as additional information. It is therefore possible to select appropriate representative tone levels with the distributed state of the tone levels of the image taken into consideration. In addition, by selecting the internal division ratio for internal representative tone levels which obviates division processing, it is possible to increase the processing speed and reduce the circuit scale. By quantizing the difference (or reference level) so as to reduce the number of encoding bits to which the difference information (or reference level information) is allotted, and allotting the information internal division ratio for internal representative tone levels being encoded to the surplus bits, the same compression ratio as in a conventional apparatus can be achieved.

In addition, the threshold values for obtaining the maximum representative tone level and the minimum representative tone level are set to the values obtained by internally dividing the interval between the maximum tone level and the minimum tone level of the pixels in a block by the internal division ratio for maximum•minimum representative tone levels which is variably designated by an external equipment, and the internal division ratio for maximum•minimum representative tone levels is selected for each block in accordance with the distribution of the tone levels of the image. It is therefore possible to select appropriate maximum or minimum representative tone level with the distributed state of the tone levels of the image taken into consideration.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A compressed image memory controlling apparatus in an image data compression and expansion circuit for dividing original image data into blocks each having a small area, encoding the data for each block into three-component data having a fixed length, said three components being a reference level for designating a representative tone level which represents the tone level of each pixel in a block, a difference for indicating the distribution range of the representative tone levels in said block, and a resolution component for indicating the representative tone level of each pixel in said block, storing said three-component data (hereinunder referred to as "encoded data") in an image memory, and reading and decoding said encoded data, said apparatus comprising:

a means for dividing the region of said image memory which can store image data for one color or one screen into N regions so as to form N memory banks independent of each other, where N is an integer of at least 2;

a means for controlling said N memory banks as one area when N memory banks are selected, and controlling said N memory banks independently of each other when either of said N memory banks is selected;

a means for selecting at least one of said N memory banks at the time of storing said encoded data in said image memory;

a means for for selecting at least one of said N memory banks at the time of reading said encoded data from said image memory; and a means for exclusively selecting the operation of writing said encoded data into said image memory and the operation of reading said encoded data from said image memory with respect to the same memory bank.

2. A compressed image memory controlling apparatus in an image data compression and expansion circuit for dividing original image data into blocks each having a small area, encoding the data for each block into three-component data having a fixed length, said three components being a reference level for designating a representative tone level which represents the tone level of each pixel in a block, a difference for indicating the distribution range of the representative tone levels in said block, and a resolution component for indicating the representative tone level of each pixel in said block, storing said three-component data in to an image memory, and reading and decoding said encoded data, said apparatus comprising:

a means for producing a control signal so that said encoded data has a data width of 1/N of the total bits of said encoded data in each block when said encoded data is written into said image memory or read from said image memory, where N is an integer of at least 2;

a means for dividing the region of said image memory which can store image data for one color or one screen into N regions so as to form N memory banks independent of each other, where N is an integer of at least 2;

a means for controlling said N memory banks as one area when N memory banks are selected, and controlling said N memory banks independently of each other when either of said N memory banks is selected;

a means for selecting at least one of said N memory banks at the time of storing said encoded data in said image memory;

a means for selecting at least one of said N memory banks at the time of reading said encoded data from said image memory; and a means for exclusively selecting the operation of writing said encoded data into said image memory and the operation of reading said encoded data from said image memory with respect to the same memory bank.

* * * * *